(12) United States Patent
Wettlaufer et al.

(10) Patent No.: US 11,918,022 B2
(45) Date of Patent: Mar. 5, 2024

(54) APPARATUS FOR GRINDING FOOD

(71) Applicant: Goodnature Products, Inc., Orchard Park, NY (US)

(72) Inventors: Dale Wettlaufer, Sarasota, FL (US); Eric Wettlaufer, West Falls, NY (US)

(73) Assignee: Goodnature Products, Inc., Buffalo, NY (US)

( * ) Notice: Subject to any disclaimer, the term of this patent is extended or adjusted under 35 U.S.C. 154(b) by 677 days.

(21) Appl. No.: 16/848,090

(22) Filed: Apr. 14, 2020

(65) Prior Publication Data

US 2020/0404958 A1 Dec. 31, 2020

Related U.S. Application Data

(62) Division of application No. 16/206,607, filed on Nov. 30, 2018, now Pat. No. 10,645,966.

(60) Provisional application No. 62/593,098, filed on Nov. 30, 2017.

(51) Int. Cl.
*A23N 1/02* (2006.01)
*A47J 19/02* (2006.01)
*A47J 19/06* (2006.01)

(52) U.S. Cl.
CPC ............... *A23N 1/02* (2013.01); *A47J 19/02* (2013.01); *A47J 19/06* (2013.01); *A23V 2002/00* (2013.01)

(58) Field of Classification Search
CPC .. A47J 19/02; A47J 19/06; A23N 1/02; A23V 2002/00
USPC ................ 99/487, 495, 509, 510, 513, 516; 426/293, 310, 425, 426, 429, 489, 573, 426/577, 615, 639, 658
See application file for complete search history.

(56) References Cited

U.S. PATENT DOCUMENTS

| | | |
|---|---|---|
| 18,895 A | 12/1857 | Eiberweiser |
| 194,457 A | 8/1877 | Newsam |
| 241,348 A | 5/1881 | Gilbert |
| 250,979 A | 12/1881 | Russell |
| 260,542 A | 7/1882 | Dannecker |
| 630,669 A | 8/1899 | Green |
| D31,714 S | 10/1899 | Carroll |
| 729,807 A | 6/1903 | Stoveken et al. |
| 929,717 A | 8/1909 | Self |
| 982,516 A | 1/1911 | Marks |
| 1,130,701 A | 3/1915 | Berrigan |
| 1,131,032 A | 3/1915 | Berrigan |

(Continued)

FOREIGN PATENT DOCUMENTS

| | | |
|---|---|---|
| CH | 359346 | 12/1961 |
| CN | 201115592 | 9/2008 |

(Continued)

OTHER PUBLICATIONS

3D Helical Ramp (R) for AutoCAD—AFV Software, Online, published date Mar. 25, 2014. Retrieved on Jan. 11, 2021 from URL: https:youtube.com/watch?v=l_uDyXcTsck (Year: 2014).

(Continued)

*Primary Examiner* — Phuong T Nguyen

(74) *Attorney, Agent, or Firm* — Knobbe Martens Olson & Bear, LLP

(57) ABSTRACT

Apparatus, system and method for cold pressing juice from a food including a food delivery chute, a food grinder, and a pressing chamber which may removably fit together as a single, stand-alone unit.

20 Claims, 32 Drawing Sheets

(56) References Cited

U.S. PATENT DOCUMENTS

| | | | |
|---|---|---|---|
| 1,456,257 A | 5/1923 | Stevenson |
| 1,698,613 A | 1/1929 | Duzer |
| 1,841,413 A | 1/1932 | Macchia |
| 2,022,679 A | 12/1935 | Leo |
| 2,068,013 A | 1/1937 | Fridlender et al. |
| 2,087,435 A | 7/1937 | Hubbert |
| 2,091,623 A | 8/1937 | Berrigan et al. |
| 2,416,043 A | 2/1947 | Bucher-Guyer |
| 2,612,100 A | 9/1952 | Bates |
| 2,714,849 A | 8/1955 | Carver |
| 3,032,087 A | 5/1962 | Rodwick |
| 3,154,122 A | 10/1964 | Batchelor et al. |
| 3,162,384 A | 12/1964 | Wright |
| 3,334,790 A | 8/1967 | Eaton |
| 3,807,294 A | 4/1974 | Ligh |
| 4,191,103 A | 3/1980 | Wettlaufer |
| 4,214,519 A | 7/1980 | Stollenwerk |
| 2,610,574 A | 9/1981 | Thompson |
| 4,287,823 A | 9/1981 | Thompson |
| 4,367,667 A | 1/1983 | Shibata |
| 4,393,737 A | 7/1983 | Shibata |
| 4,420,404 A | 12/1983 | Coate et al. |
| 4,456,185 A | 6/1984 | Ribassin et al. |
| 4,539,793 A | 9/1985 | Malek |
| 4,674,690 A | 6/1987 | Ponikwia et al. |
| 4,680,808 A | 7/1987 | Paleschuck |
| 4,730,555 A | 3/1988 | Blanchot |
| 4,778,117 A | 10/1988 | Karg |
| 4,892,665 A | 1/1990 | Wettlaufer |
| 4,986,912 A | 1/1991 | Fisch |
| 5,031,524 A | 7/1991 | Wettlaufer |
| 5,045,186 A | 9/1991 | Takashima |
| 5,143,628 A | 9/1992 | Bott et al. |
| 5,146,848 A | 9/1992 | Dufour |
| 5,205,498 A | 4/1993 | Ostermeier et al. |
| 5,207,152 A | 5/1993 | Wettlaufer |
| 5,267,509 A | 12/1993 | Wettlaufer |
| 5,275,097 A | 1/1994 | Wettlaufer |
| 5,340,036 A | 8/1994 | Riley |
| 5,356,083 A | 10/1994 | Wettlaufer |
| 5,533,681 A | 7/1996 | Riley |
| D373,705 S | 9/1996 | Austin |
| 5,551,606 A | 9/1996 | Rai et al. |
| 5,613,434 A | 3/1997 | Hartmann |
| 5,862,748 A | 1/1999 | Witter |
| 6,123,018 A | 9/2000 | Wettlaufer et al. |
| 6,159,527 A | 12/2000 | Wettlaufer |
| 6,422,138 B1 | 7/2002 | Ballard |
| 6,457,403 B1 | 10/2002 | Wettlaufer et al. |
| D482,938 S | 12/2003 | Renault |
| D554,441 S | 11/2007 | Malcolm et al. |
| 7,337,996 B2 | 3/2008 | Hanson et al. |
| 7,448,317 B2 | 11/2008 | Pinnow |
| 7,607,599 B2 | 10/2009 | Jara-Almonte et al. |
| 7,753,297 B2 | 7/2010 | Hanson et al. |
| 7,866,583 B2 | 1/2011 | Jara-Almonte |
| 7,950,601 B2 | 5/2011 | Watts |
| 8,387,520 B2 | 3/2013 | Backus |
| 8,578,846 B2 | 11/2013 | Sherwood |
| D725,439 S | 3/2015 | Kim |
| 9,027,472 B2 | 5/2015 | Bertocchi |
| D741,653 S | 10/2015 | Zhang |
| D743,204 S | 11/2015 | Zhang |
| D774,848 S | 12/2016 | Flotats Molinas et al. |
| 9,763,470 B2 | 9/2017 | Feinberg et al. |
| 9,844,229 B2 | 12/2017 | Wettlaufer et al. |
| 9,888,802 B2 | 2/2018 | Holzbauer et al. |
| D812,426 S | 3/2018 | Kociolek et al. |
| D830,795 S | 10/2018 | Phillips-Solomon |
| 10,130,118 B2 | 11/2018 | Contell Albert et al. |
| 11,344,052 B2 | 5/2022 | Wettlaufer et al. |
| 11,785,977 B2 | 10/2023 | Wettlaufer et al. |
| 2001/0031302 A1 | 10/2001 | Balkos et al. |
| 2008/0098908 A1 | 5/2008 | Song |
| 2008/0116305 A1 | 5/2008 | Hanson et al. |
| 2011/0185921 A1 | 8/2011 | Lee |
| 2012/0037013 A1 | 2/2012 | Bertocchi |
| 2012/0048127 A1 | 3/2012 | Huang et al. |
| 2012/0090478 A1 | 4/2012 | Lin |
| 2013/0068116 A1 | 3/2013 | Fister et al. |
| 2013/0074708 A1 | 3/2013 | Asbury et al. |
| 2014/0224137 A1 | 8/2014 | Wettlaufer et al. |
| 2014/0306042 A1 | 10/2014 | Chesack et al. |
| 2014/0314918 A1 | 10/2014 | Wettlaufer et al. |
| 2015/0257435 A1 | 9/2015 | Farm |
| 2015/0359256 A1 | 12/2015 | Wettlaufer et al. |
| 2015/0374025 A1 | 12/2015 | Evans et al. |
| 2016/0199760 A1 | 7/2016 | Wettlaufer |
| 2017/0295982 A1 | 10/2017 | Holzbauer et al. |
| 2018/0084818 A1 | 3/2018 | Wettlaufer et al. |
| 2018/0103676 A1 | 4/2018 | Wettlaufer et al. |
| 2018/0297310 A1 | 10/2018 | Evans et al. |
| 2018/0297313 A1 | 10/2018 | Katz et al. |
| 2019/0159507 A1 | 5/2019 | Wettlaufer et al. |
| 2019/0193359 A1 | 6/2019 | Wettlaufer et al. |
| 2020/0367696 A1 | 11/2020 | Wettlaufer et al. |
| 2022/0346430 A1 | 11/2022 | Wettlaufer et al. |
| 2023/0218101 A1 | 7/2023 | Wettlaufer et al. |
| 2023/0218102 A1 | 7/2023 | Wettlaufer et al. |

FOREIGN PATENT DOCUMENTS

| | | | |
|---|---|---|---|
| CN | 201245539 | | 5/2009 |
| CN | 201604303 | | 10/2010 |
| CN | 202515365 | | 11/2012 |
| CN | 205727969 | * | 11/2016 ............... A23N 1/02 |
| EP | 1364558 | | 3/2005 |
| EP | 1632338 | | 3/2006 |
| FR | 2806880 | | 10/2001 |
| JP | 2006-094902 | | 4/2006 |
| JP | 2015039493 | | 3/2015 |
| KR | 20030004642 | | 1/2003 |
| WO | WO 2020/242897 | | 12/2020 |
| WO | WO 2023/137389 | | 7/2023 |

OTHER PUBLICATIONS

Create curved ramp. Online, published date May 19, 2017. Retrieved on Jan. 11, 2021 from URL: https://forums.autodesk.com/t5/fusion-360-design-validate/create-curved-ramp/td-p/7088070 (Year: 2017).

Pusher, Online, published date unknown, Retrieved on Jan. 11, 2021 from URL: https://www.goodnatureproducts.com/m1-pusher/ (Year 2021).

Norwalk. 2014. Model 280 Features. Retrieved on Oct. 9, 2015 from http://wwww.norwalkjuicers.com/features/.

Norwalk. 2014. Model 280 Technical Specifications. Retrieved on Oct. 9, 2015 from http://wwww.norwalkjuicers.com/technical-specs/.

International Search Report and Written Opinion dated Mar. 22, 2019 in International Application No. PCT/US2018/063384.

International Preliminary Report on Patentability dated Jun. 2, 2020 in International Application No. PCT/US2018/063384.

Gauze, retrieved date Oct. 10, 2021. https://www.combatsports.com/ringside-super-gauze-single-roll.html?mkwid =_dc&pcrid=452569739406&pkw=&pmt=&gclid=EAlalQobChMI57Klr_XA8wIVAr_ICh36pgJ6EAQYByABEgJxLfD_BwE.

* cited by examiner

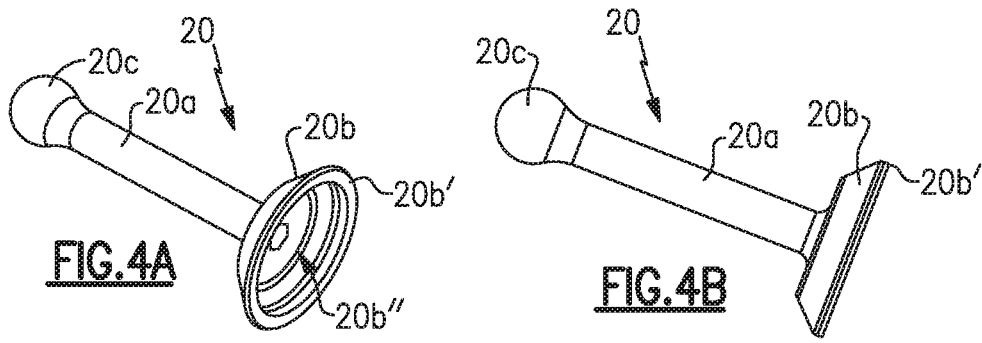
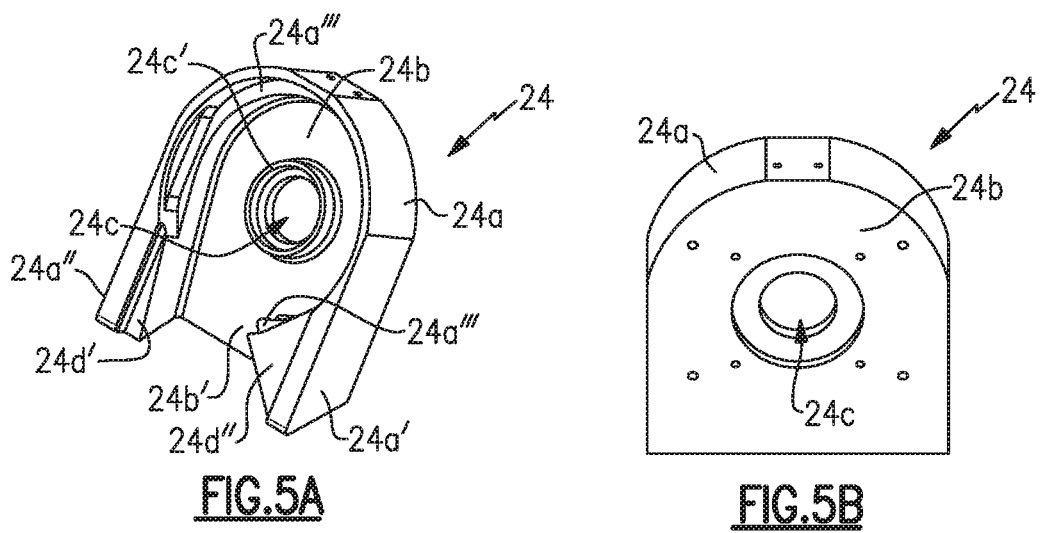
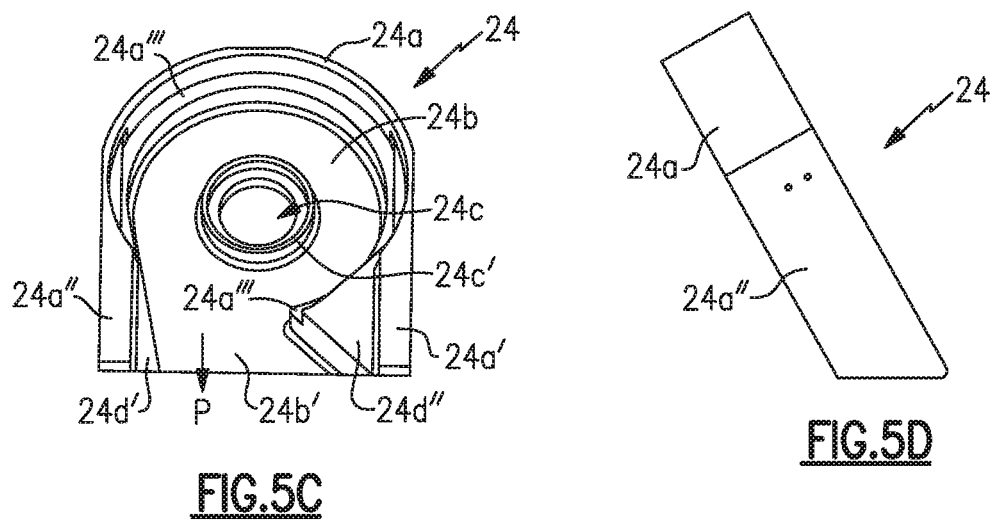

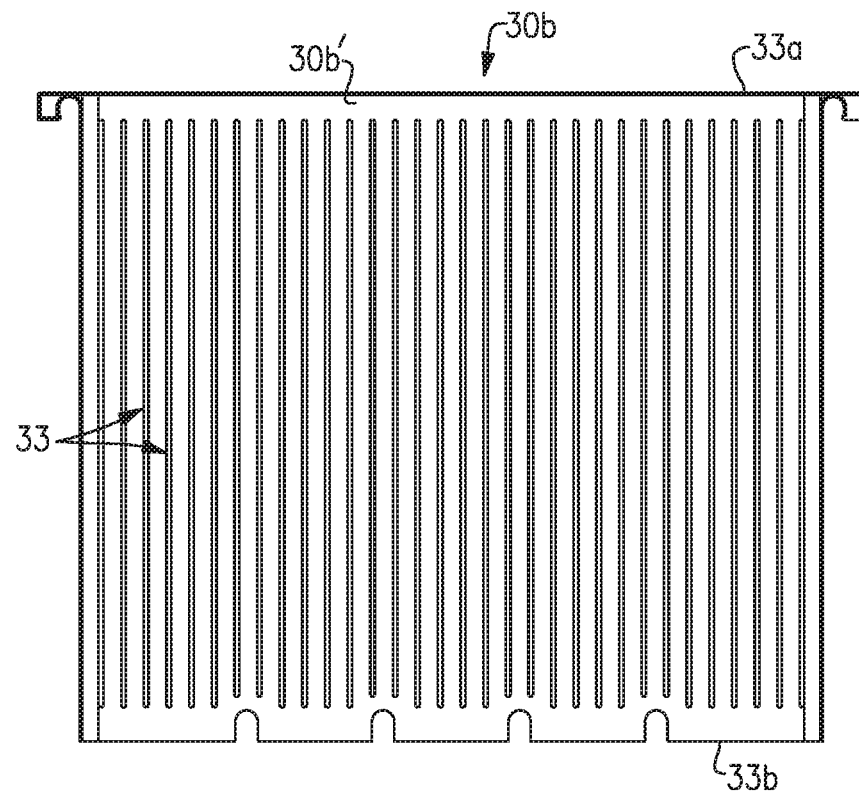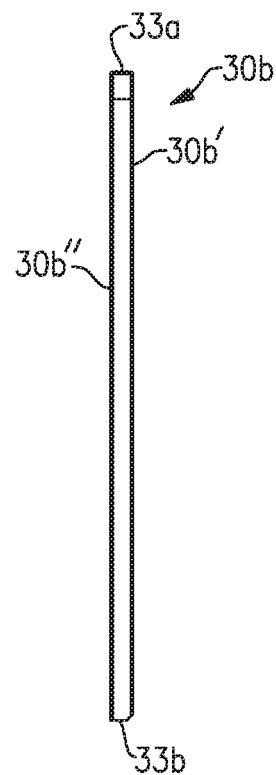
FIG.9A
FIG.9B
FIG.9C
FIG.9D

APPARATUS FOR GRINDING FOOD

INCORPORATION BY REFERENCE TO RELATED APPLICATIONS

The present application is a division of U.S. patent application Ser. No. 16/206,607, filed Nov. 30, 2018, which claims the benefit of priority to U.S. Provisional Application No. 62/593,098, filed Nov. 30, 2017, the entirety of each of which is hereby incorporated by reference herein.

BACKGROUND OF THE INVENTION

The invention relates to cold press juicing, and more particularly relates to a cold press juicing machine, system and method having a grinder capable of grinding large partial and whole food pieces which exit the grinder and are deposited into a pressing chamber which delivers pressed juice to a vessel for immediate consumption or cold storage.

While cold press juicing apparatus, systems and methods have been known for many years, there remains a need for a cold press apparatus, system and method which allows an operator to very quickly and efficiently grind and press juice from a wide variety of different types of food including fibrous root types (e.g., ginger root) which prior art grinders do not process very well, if at all. It is furthermore desirable that the apparatus, system and method be capable of processing large partial and whole food pieces in a single, stand-alone unit of a size that may be placed upon a counter-top, and is also inherently sanitary, easy to clean and safe to use.

SUMMARY OF THE INVENTION

The present invention addresses the above needs by providing in a first aspect a hopper or chute in which an operator may place large partial or whole food pieces.

In another aspect the invention provides a grinder for reducing the partial and whole food pieces. The chute may be removably attached to the grinder whereby the food pieces are directed to the grinder as they are placed into the chute.

In another aspect the invention provides a pressing chamber which includes first and second pressing walls, at least one of which is movable toward the other. The pressing chamber may be removably mounted to the frame that also holds the chute and grinder.

In yet another aspect the invention provides a system for cold pressing juice from a food including a food delivery chute, a food grinder, and a pressing chamber which may removably fit together as a single, stand-alone unit.

In another aspect, the present invention broadly provides a method of cold press juicing comprising the steps of placing a disposable filter into a pressing chamber between first and second pressing walls; delivering food pieces into a chute attached to a grinder; operating the grinder to reduce the food pieces into smaller pieces, directing the reduced food mass into the pressing chamber; and causing one or both pressing walls to move toward each other and thereby press juice from the filter.

Additional objects, advantages and novel aspects of the present invention will be set forth in part in the description which follows, and will in part become apparent to those in the practice of the invention, when considered with the attached figures.

DESCRIPTION OF THE DRAWING FIGURES

The above-mentioned and other features and advantages of this invention, and the manner of attaining them, will become apparent and be better understood by reference to the following description of the invention in conjunction with the accompanying drawing, wherein.

Figure 2A:
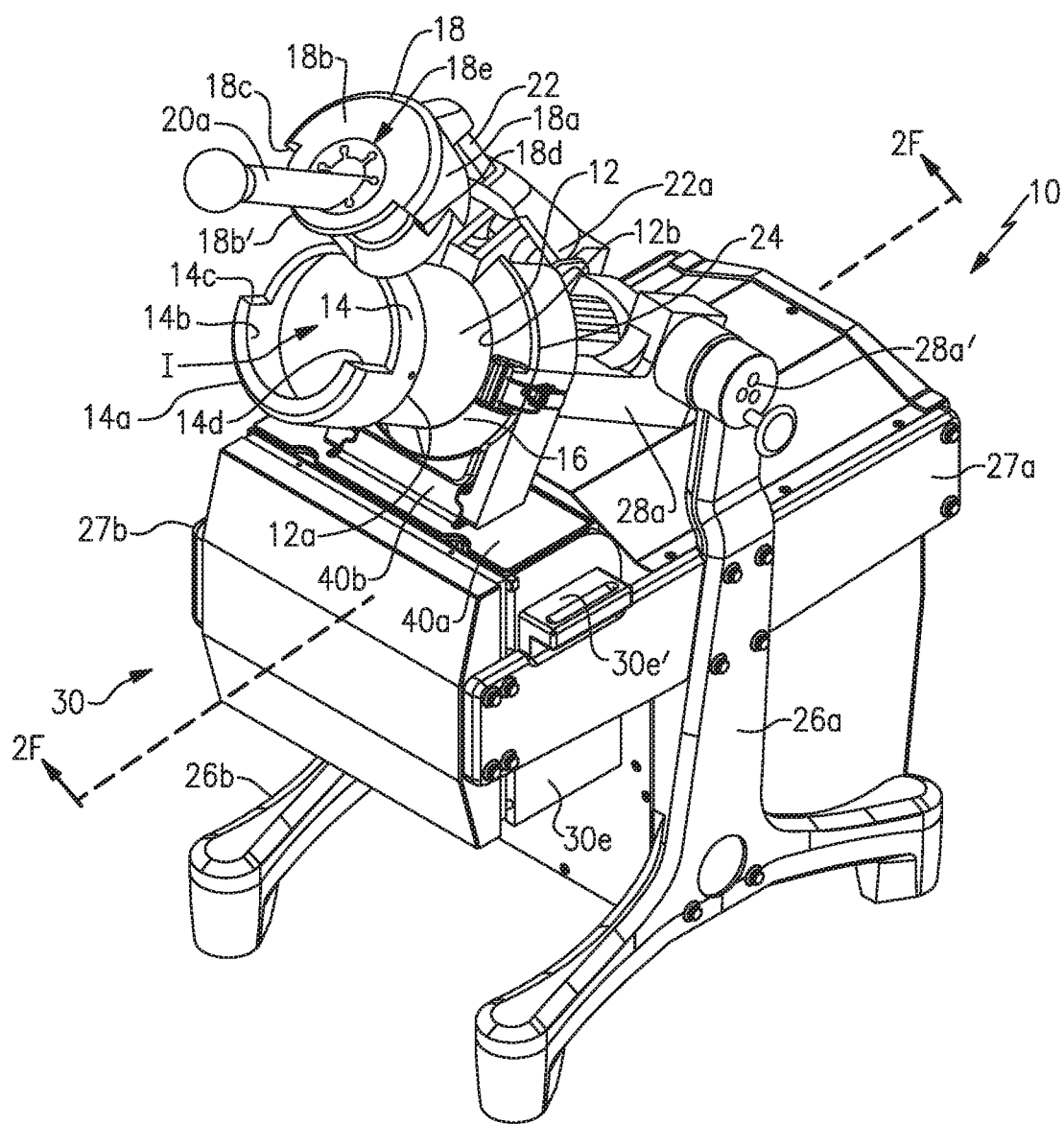
Figure 2B:
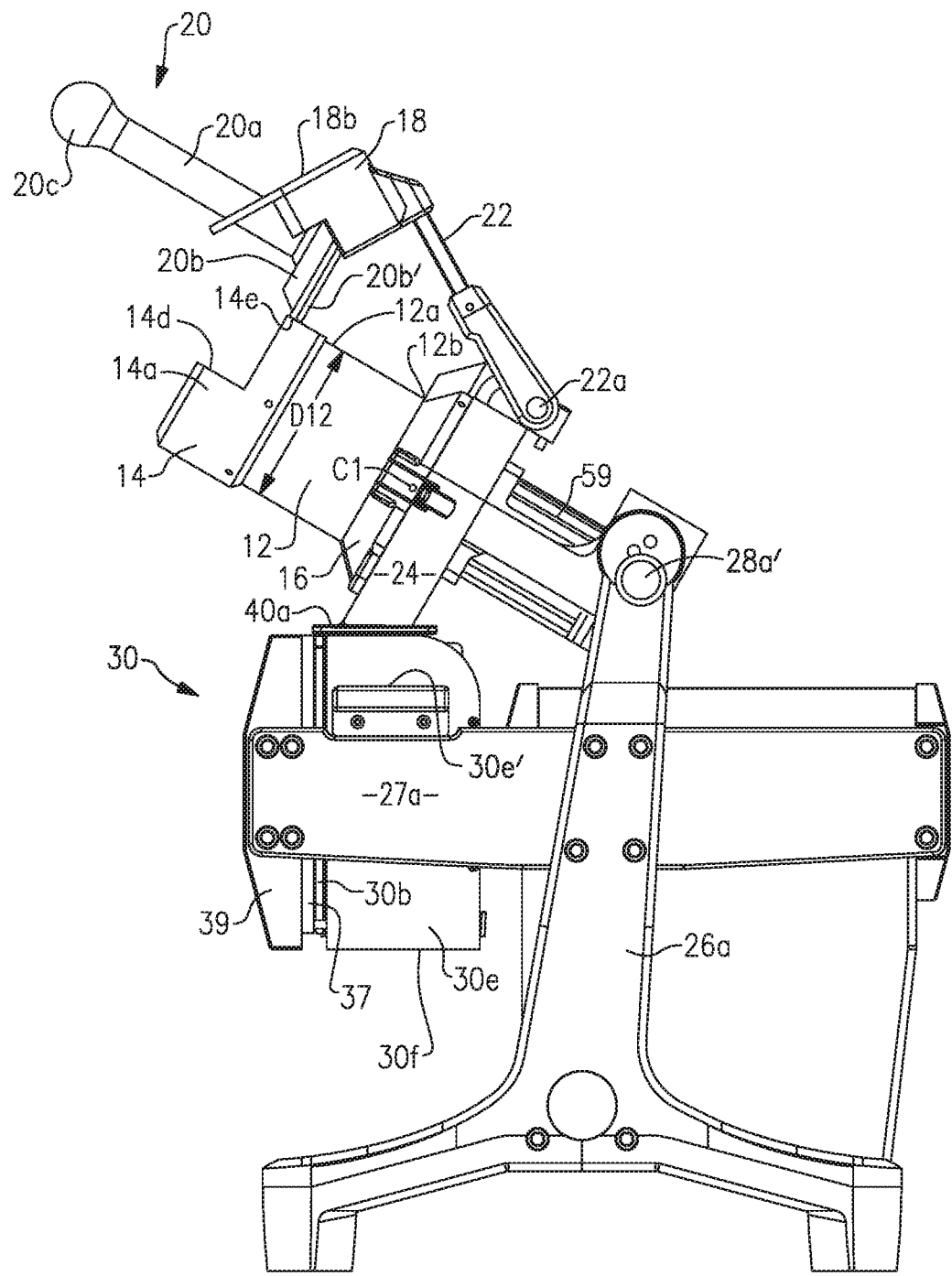
Figure 2C:
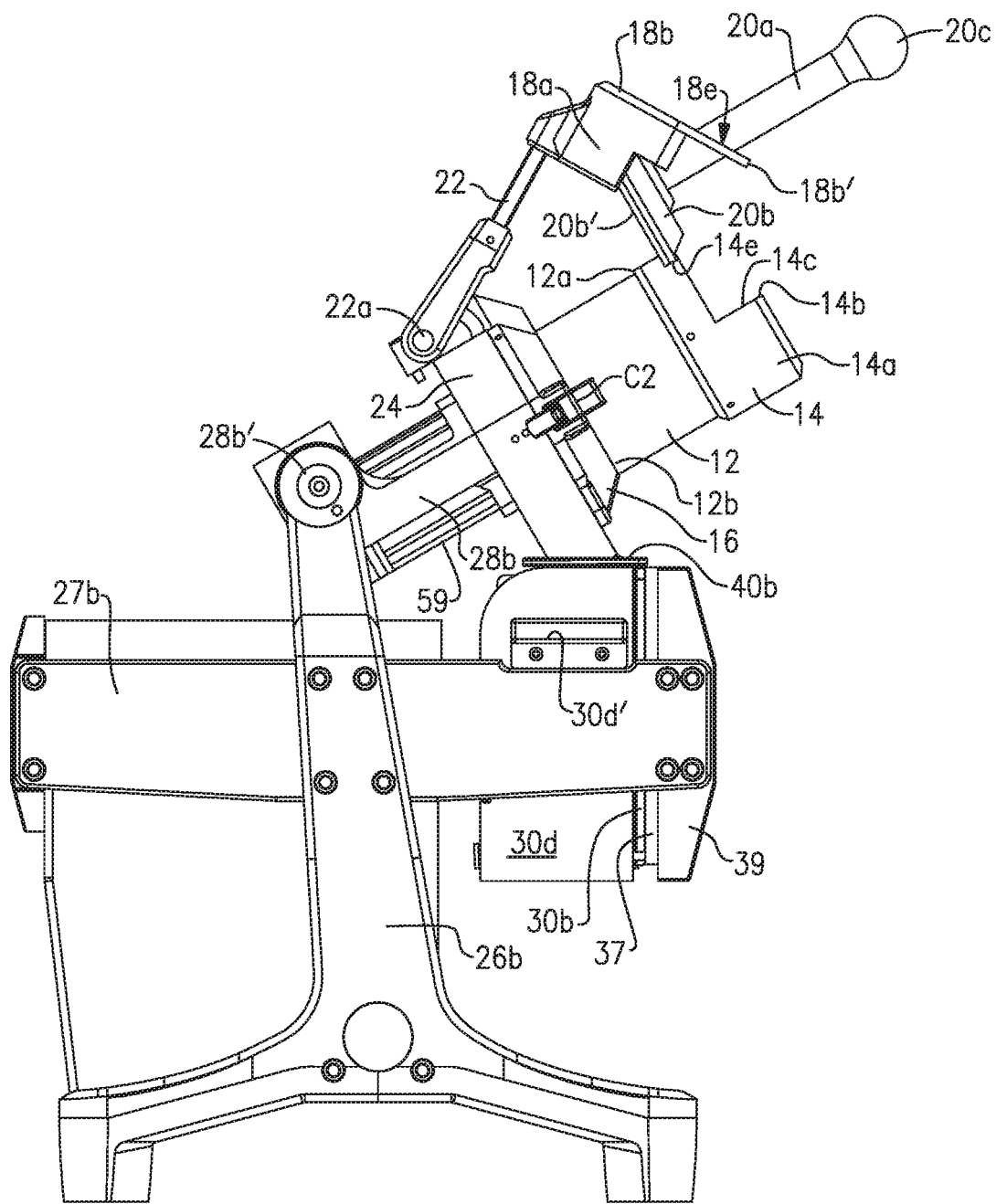
Figure 2D:
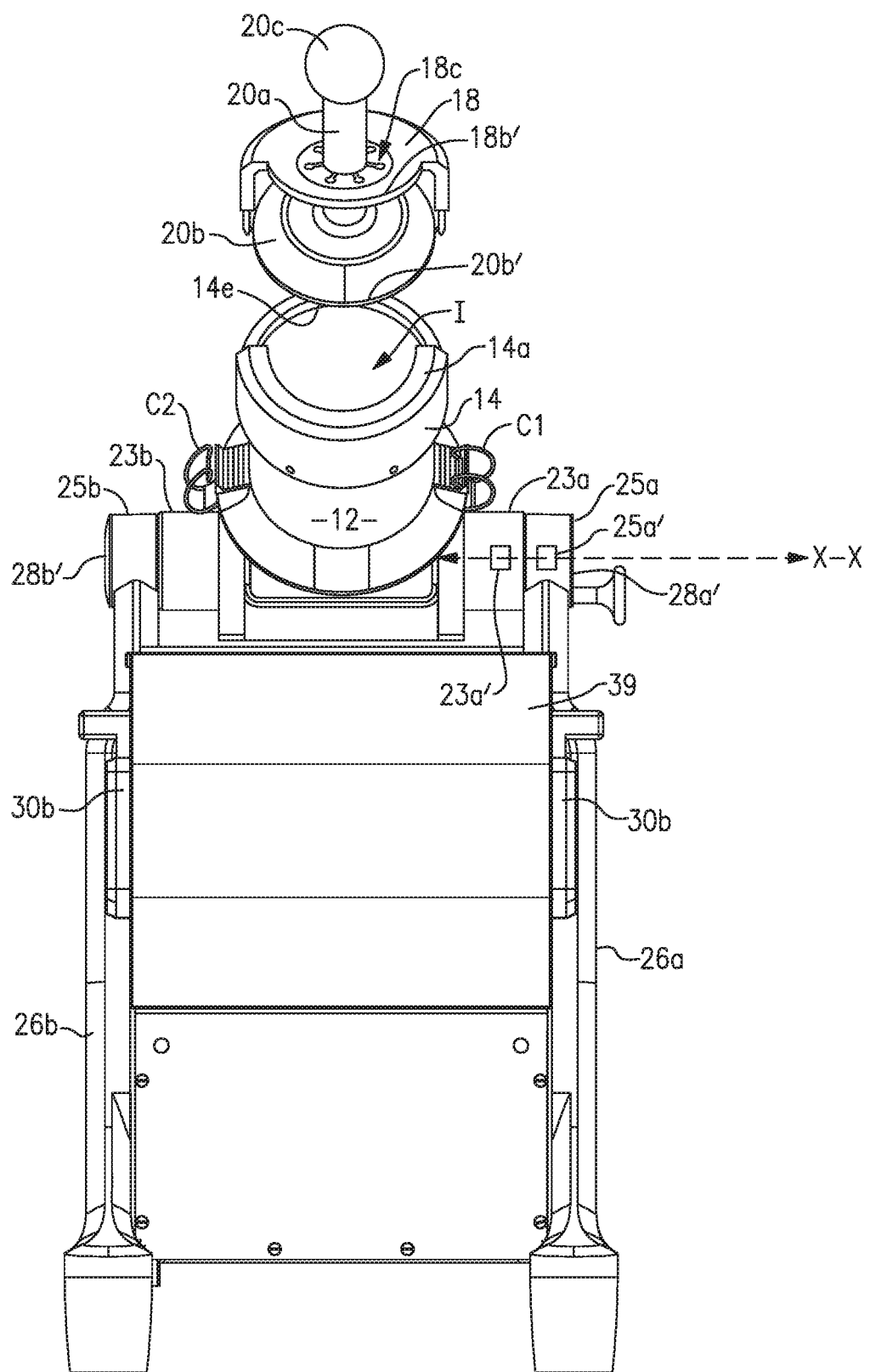
Figure 2E:
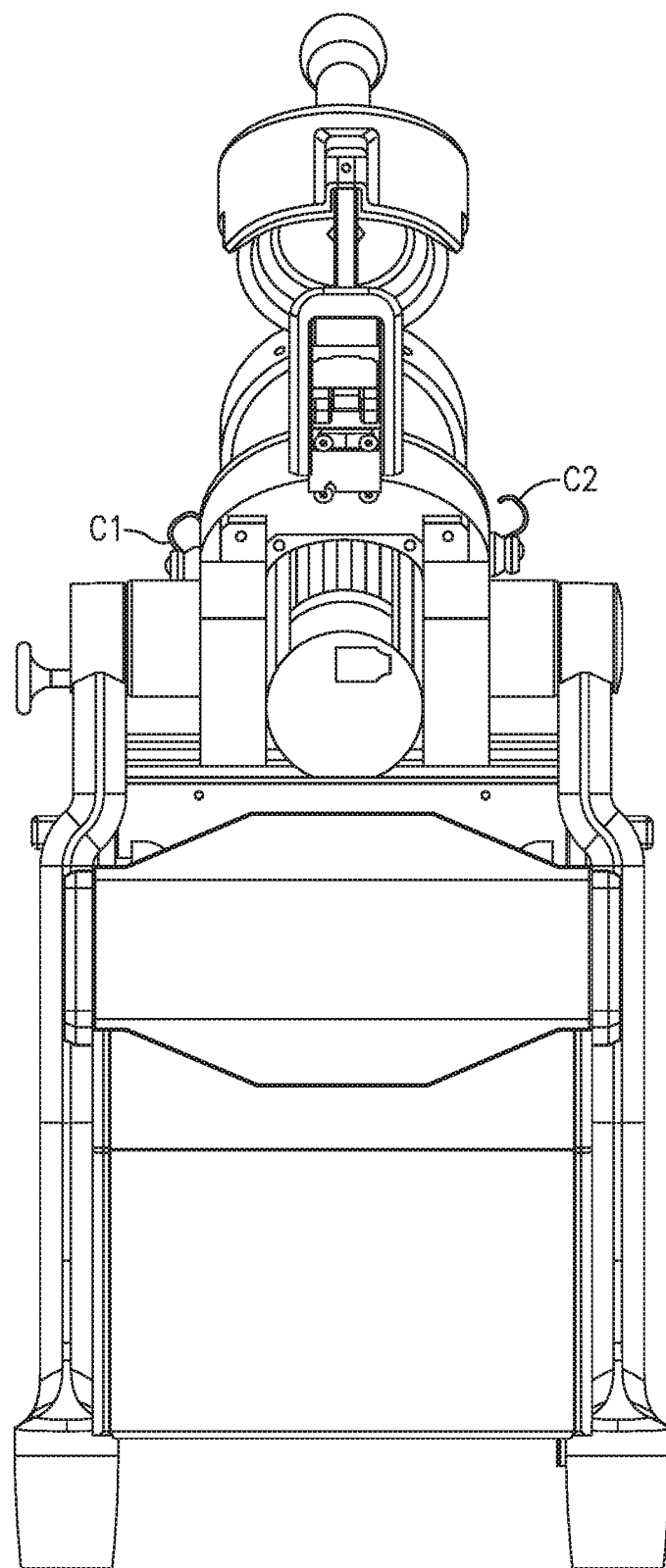
Figure 2F:
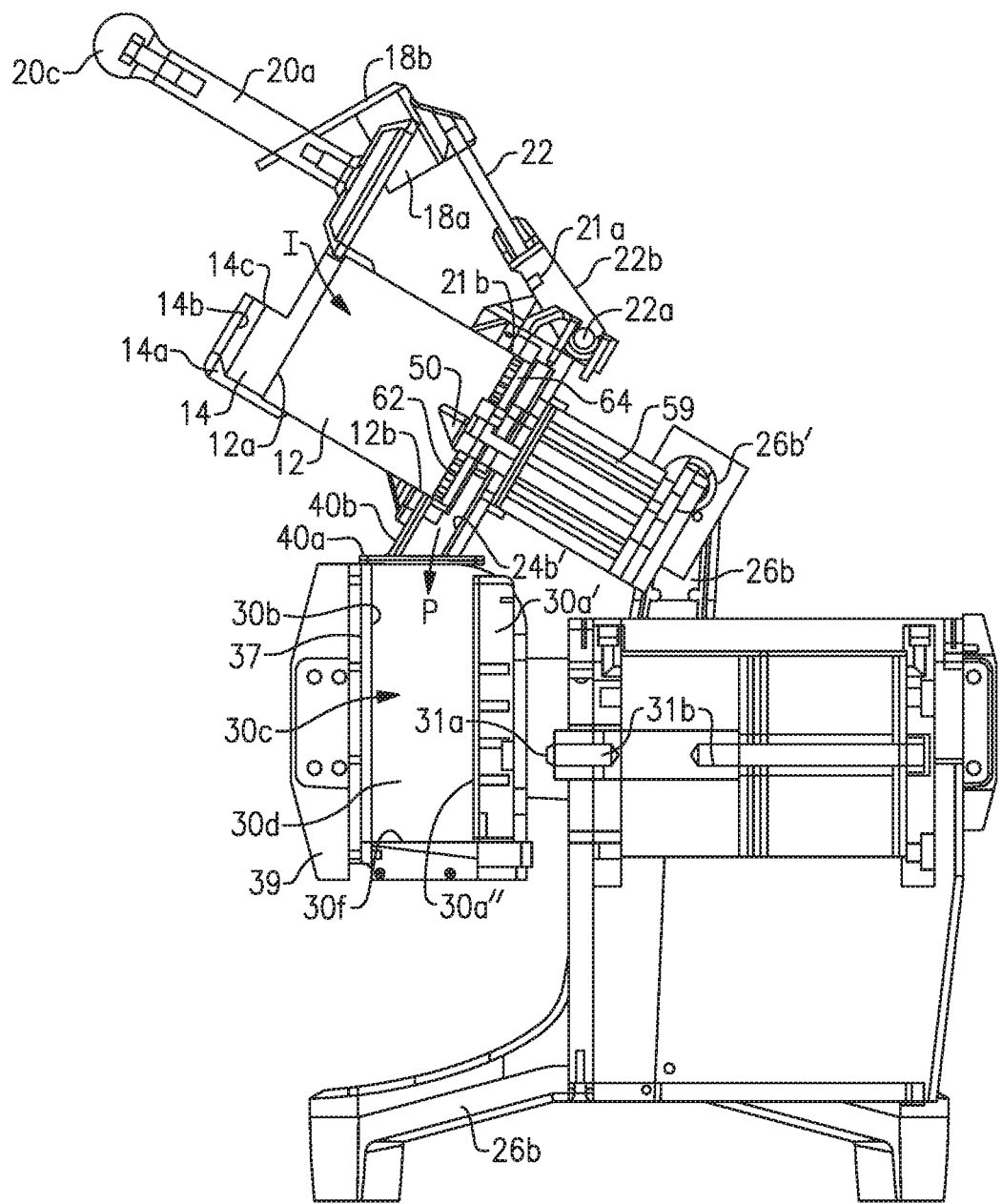
Figure 2G:
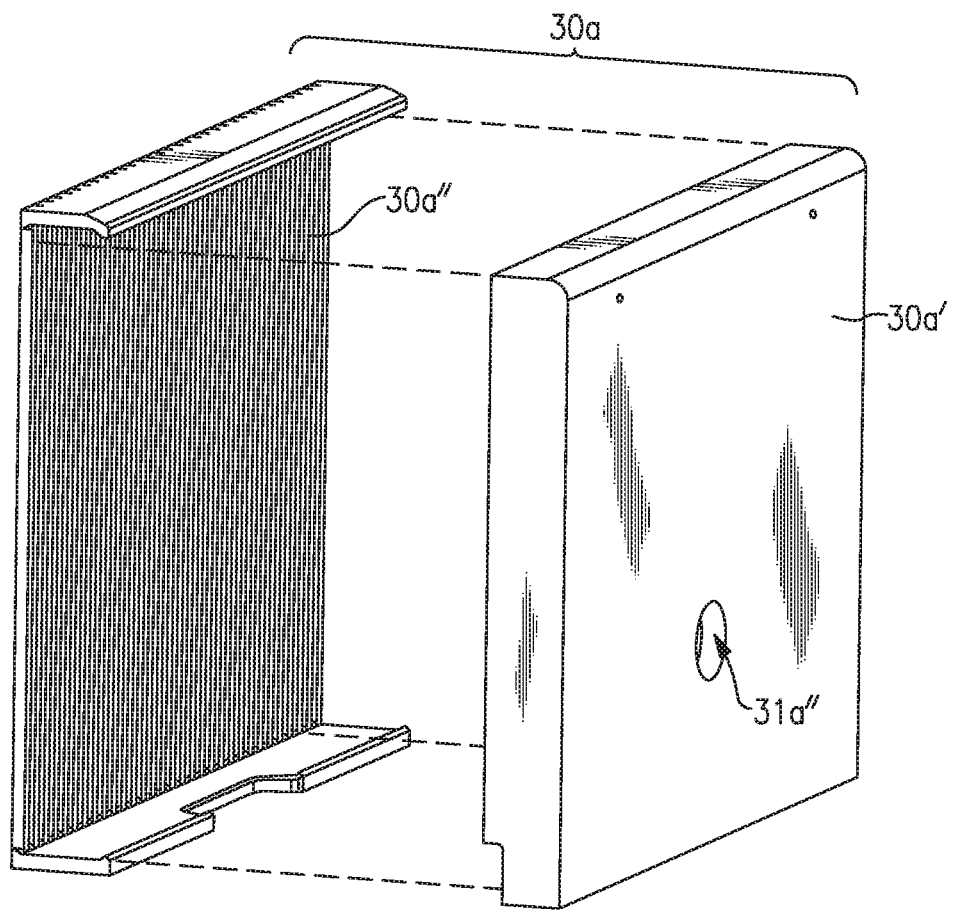
Figure 2H:
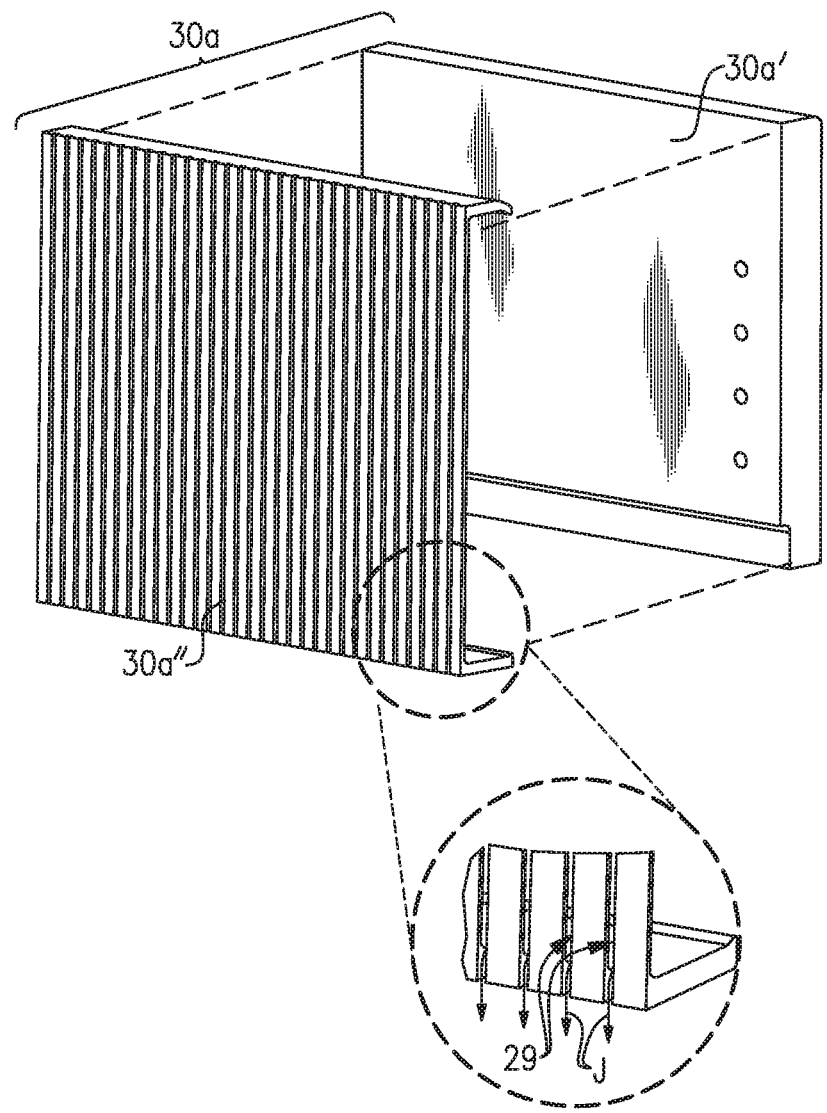
Figure 3A:
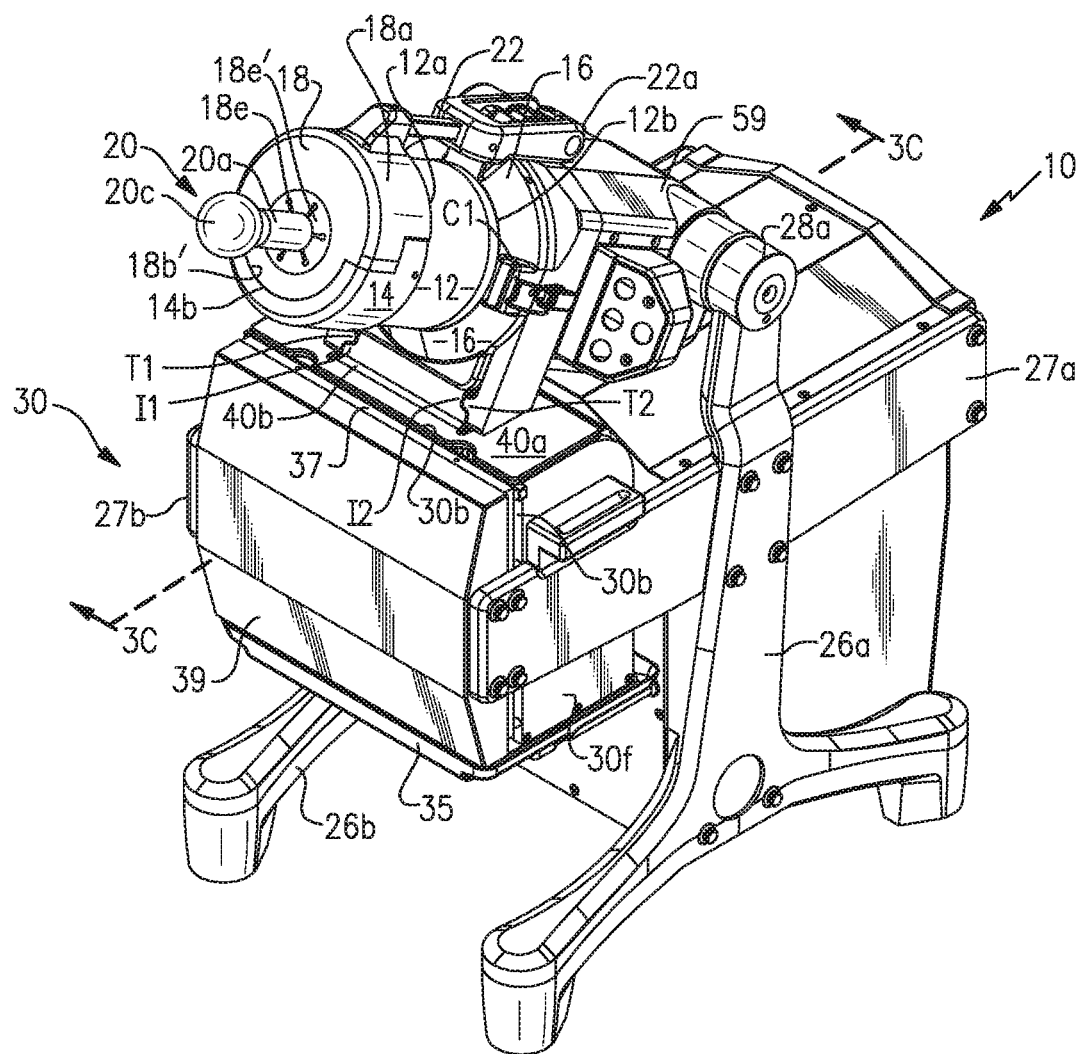
Figure 3B:
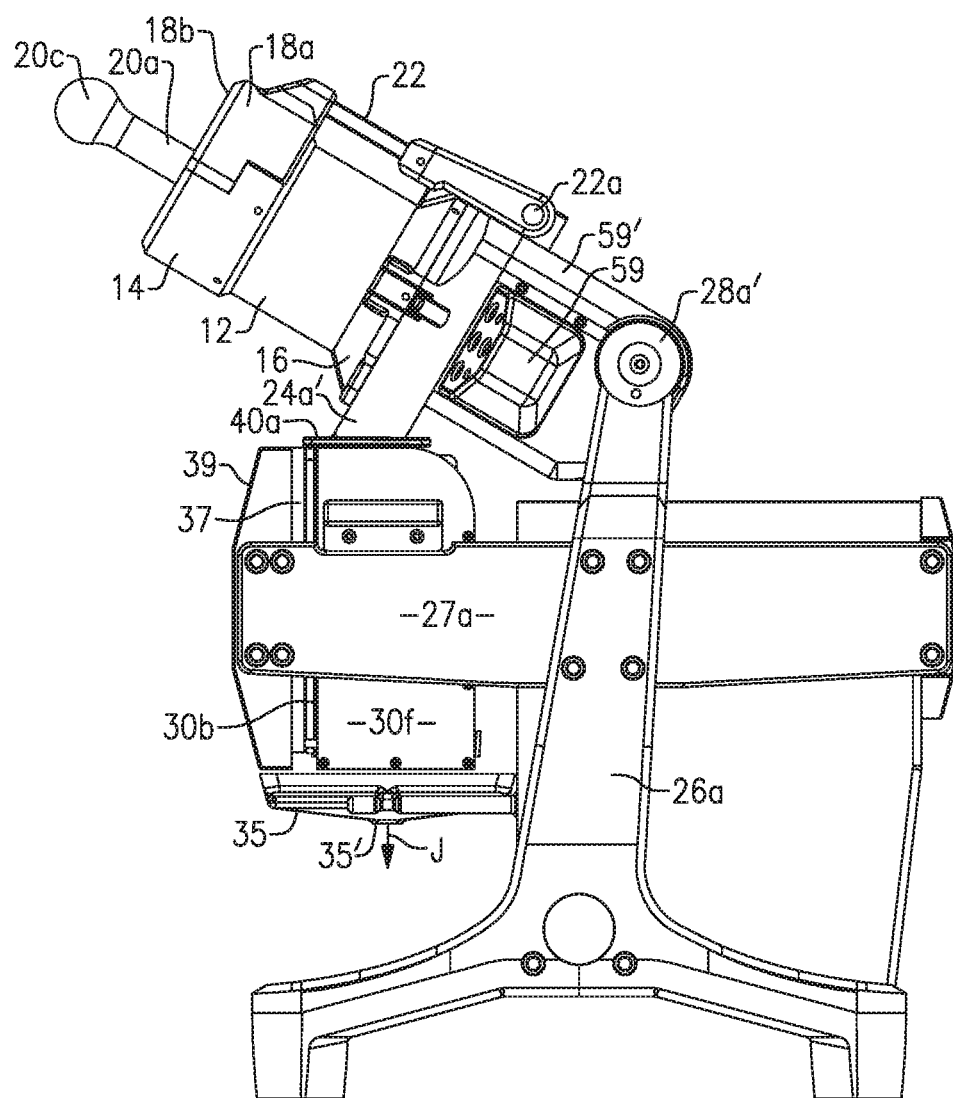
Figure 3C:
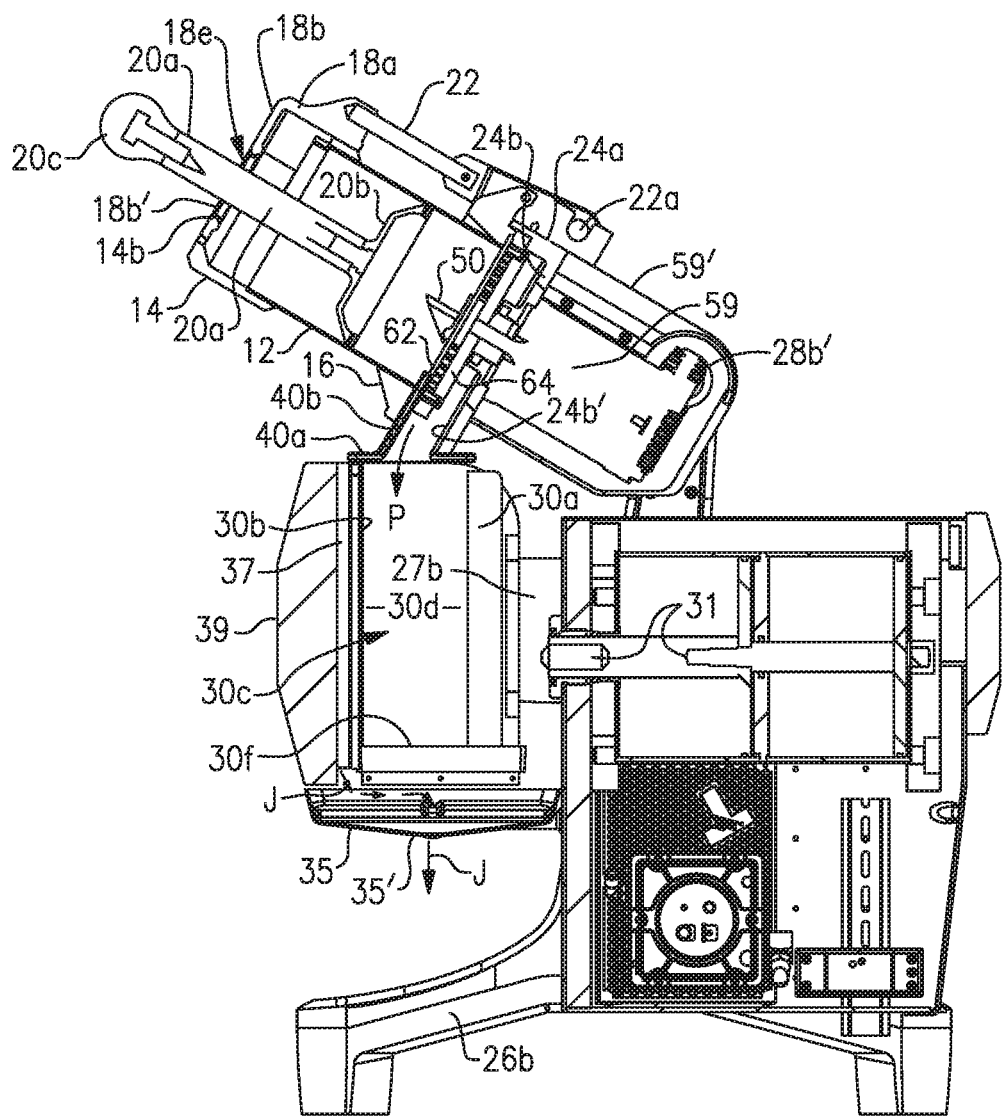
Figure 3D:
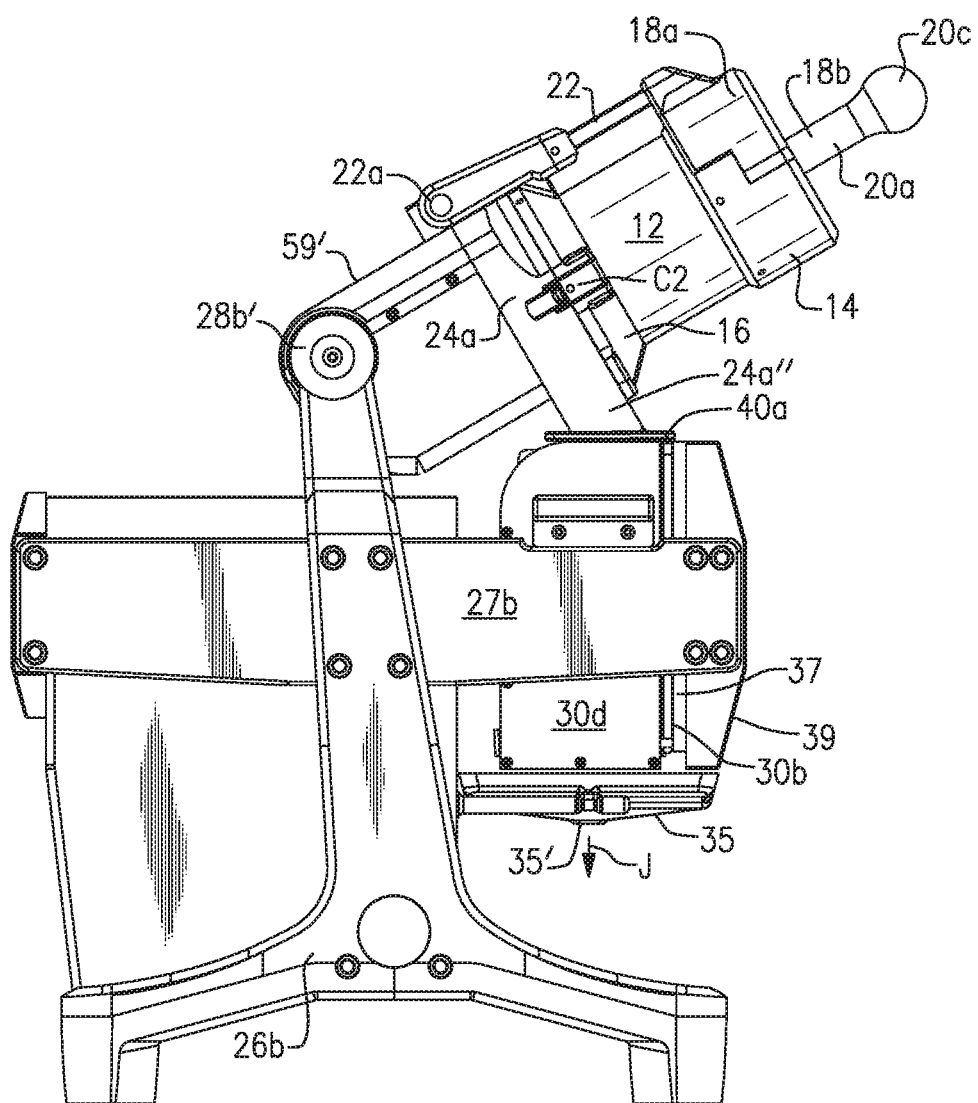
Figure 3E:
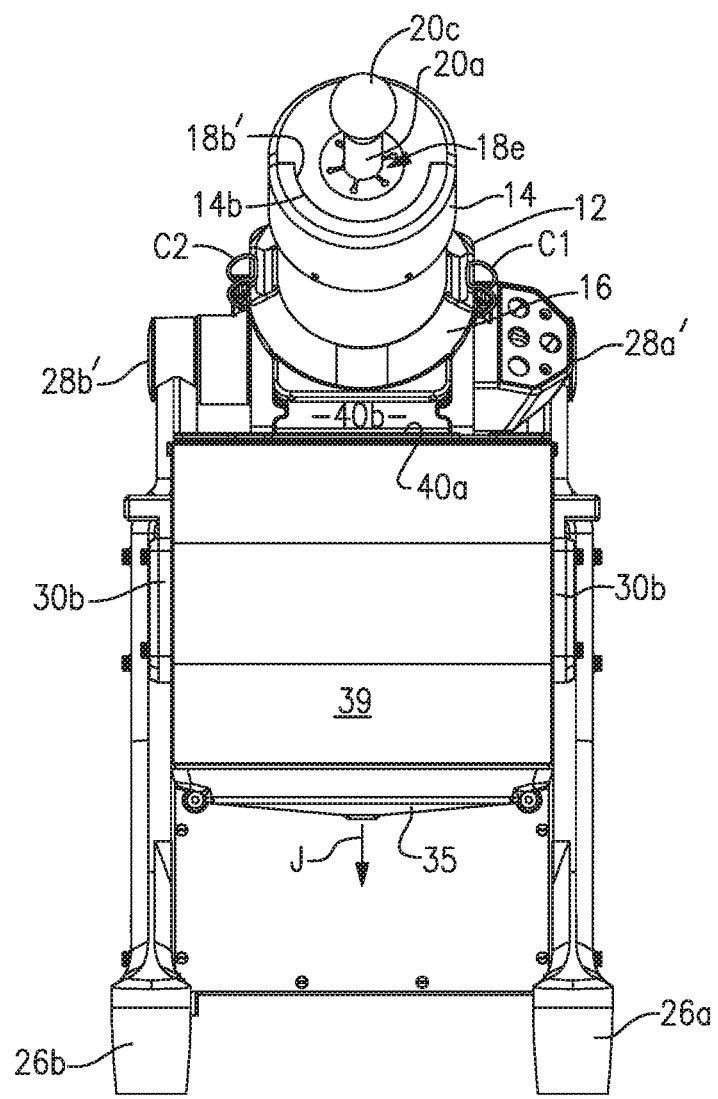
Figure 3F:
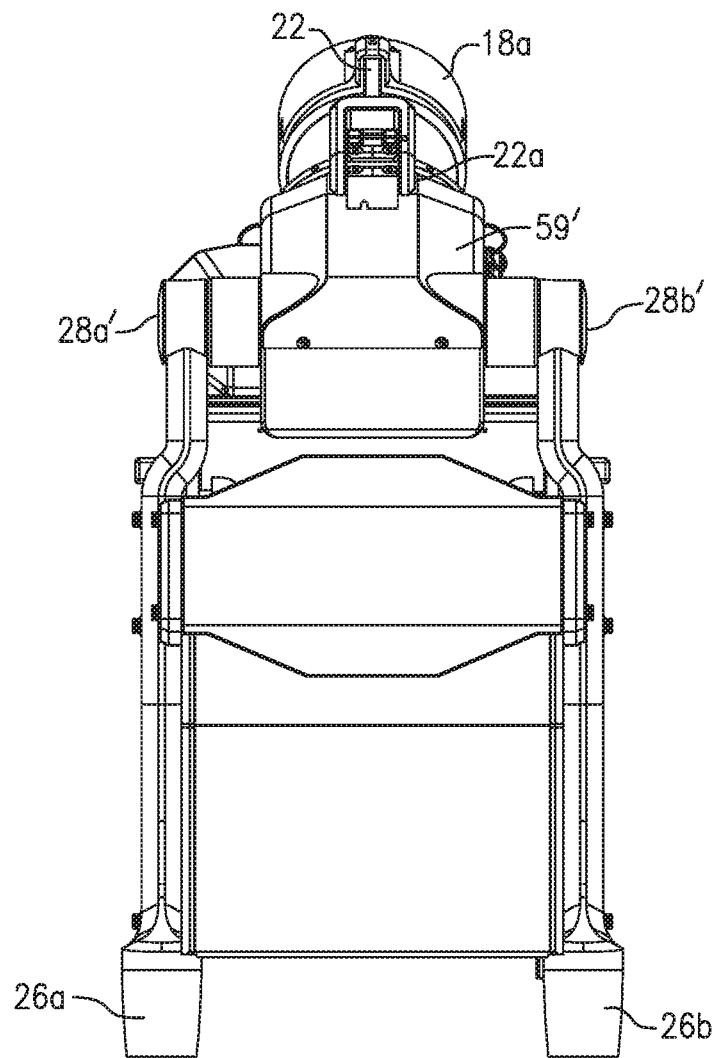
Figure 6A:
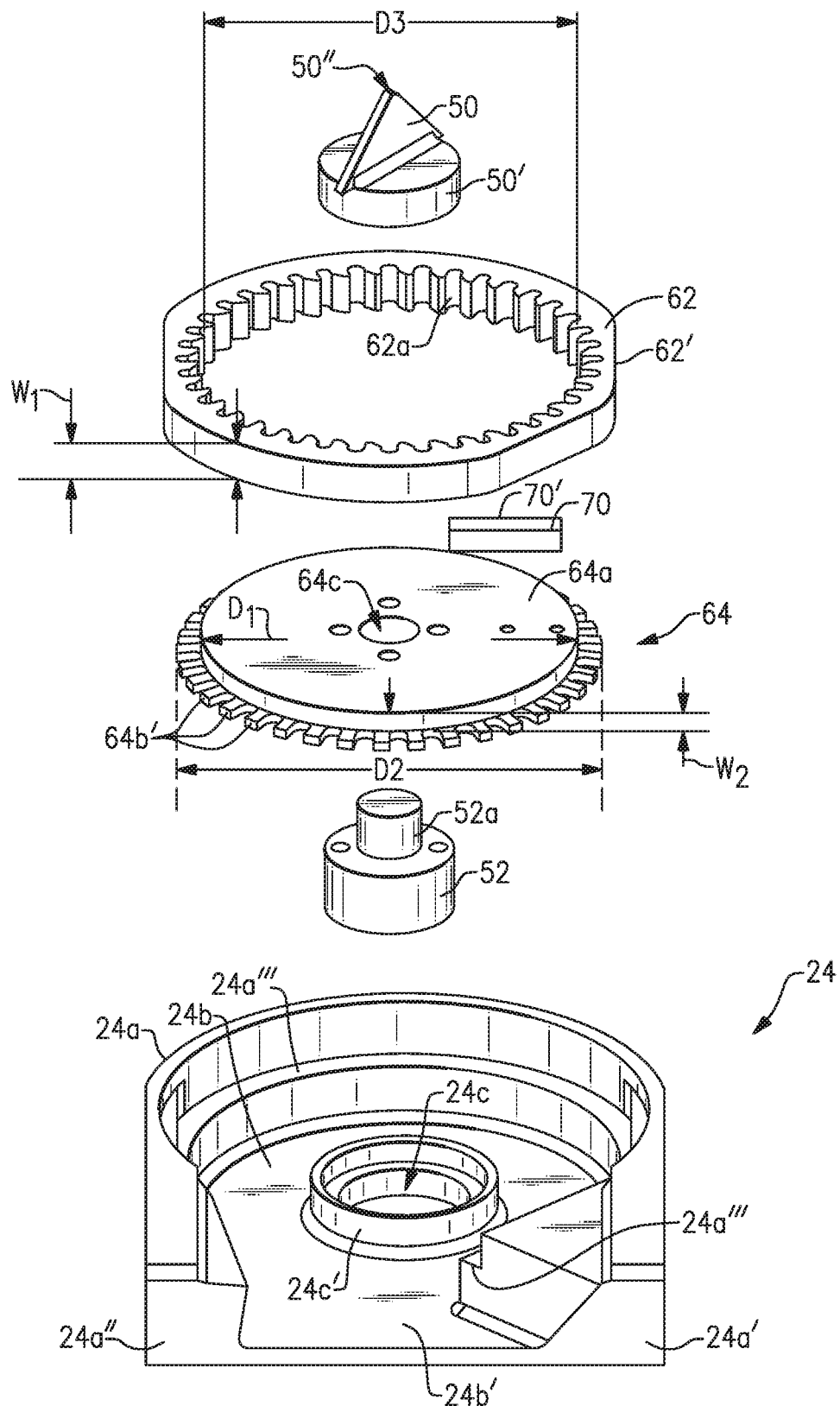
Figure 6B:
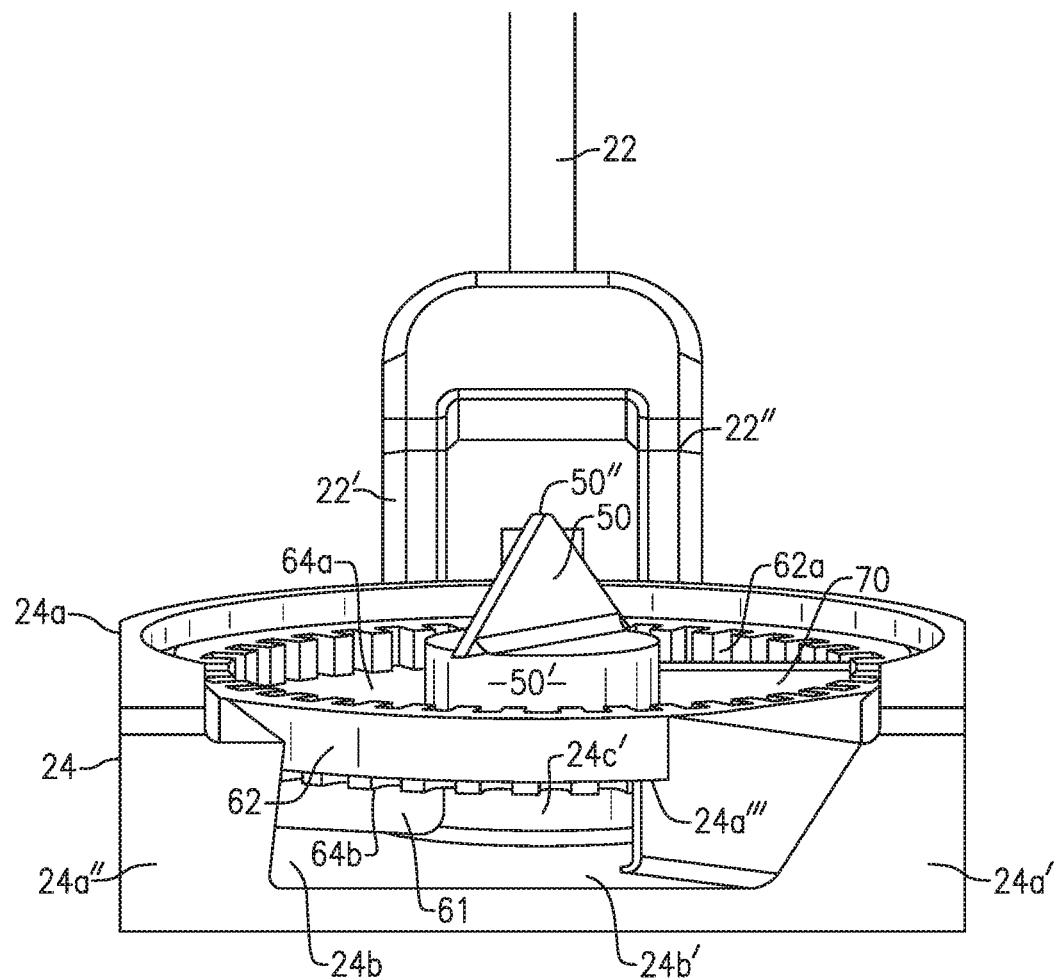
Figure 6C:
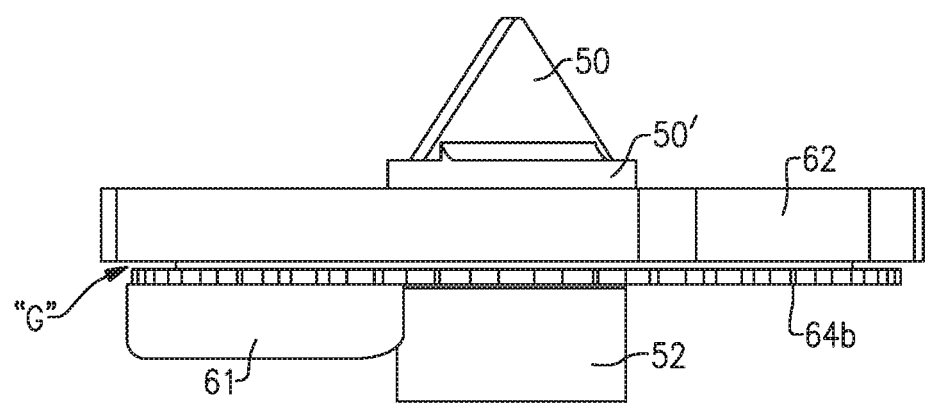
Figure 6D:
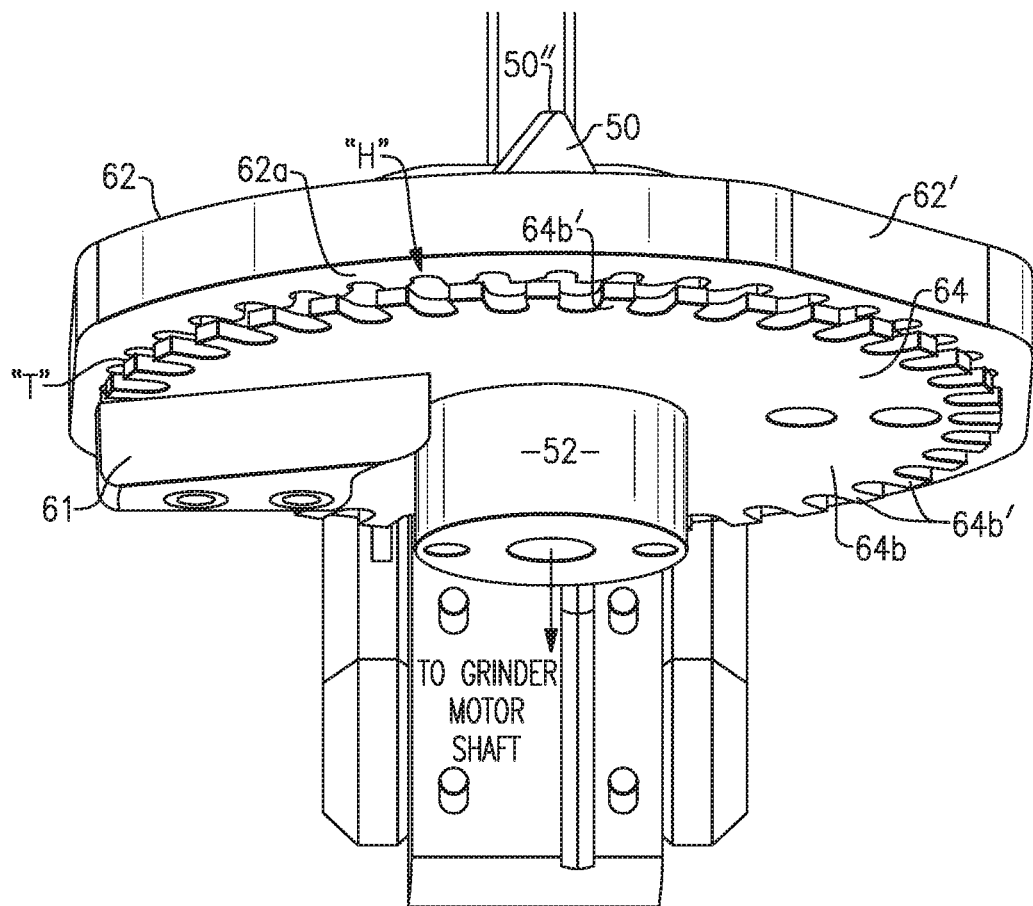
Figure 6E:
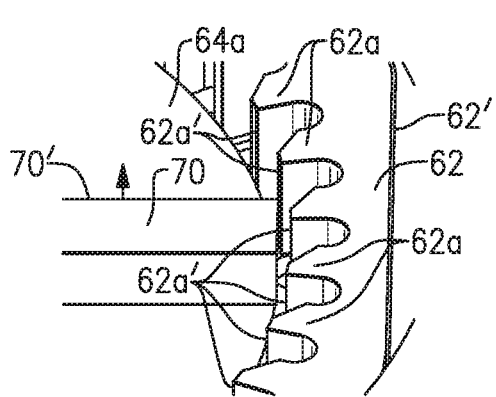
Figure 6F:
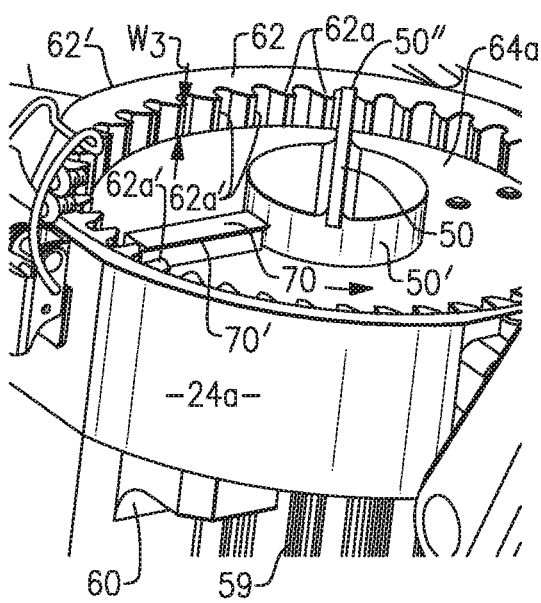
Figure 6G:
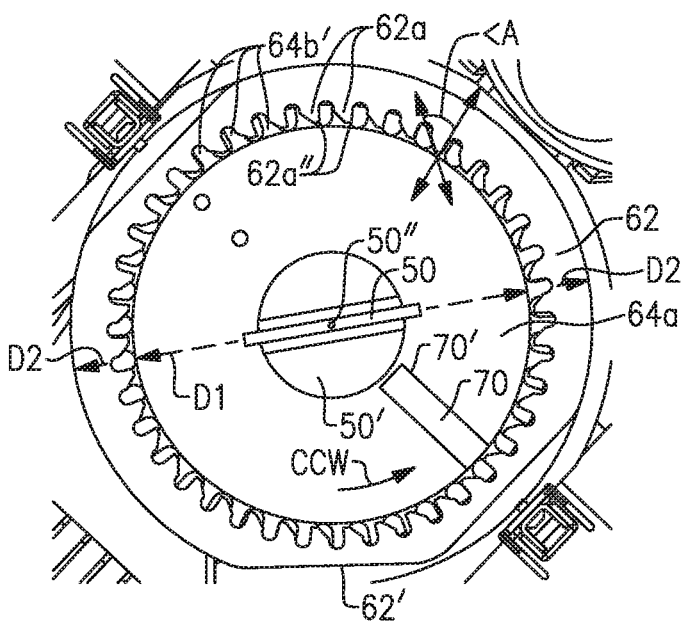
Figure 6H:
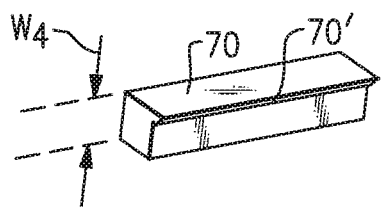
Figure 7:
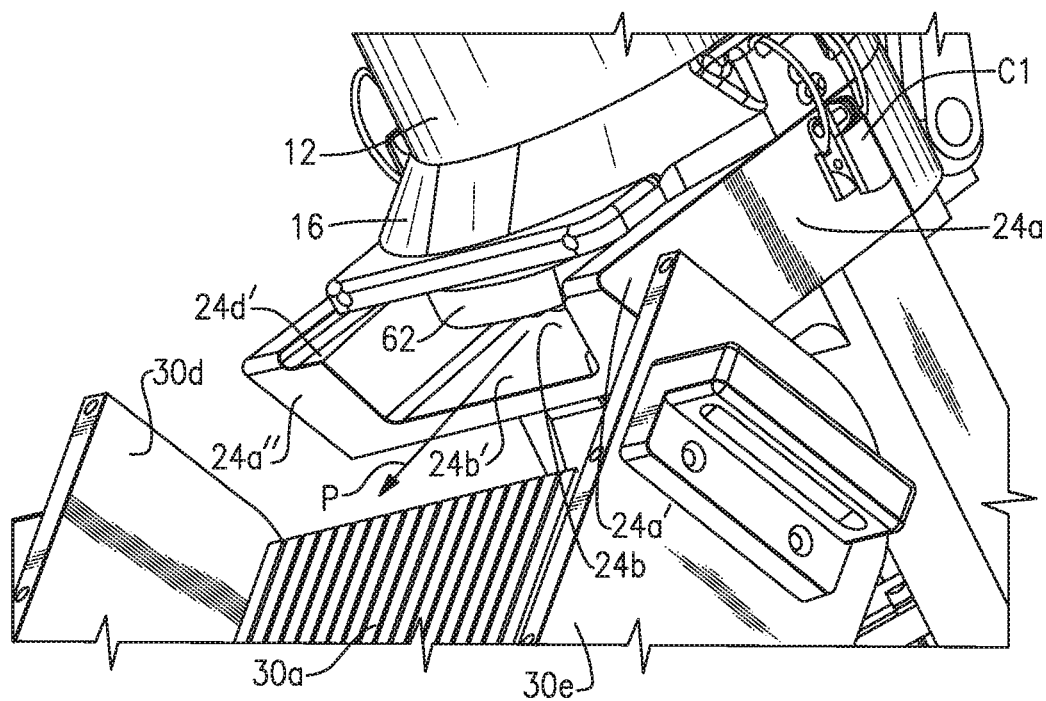
Figure 8A:
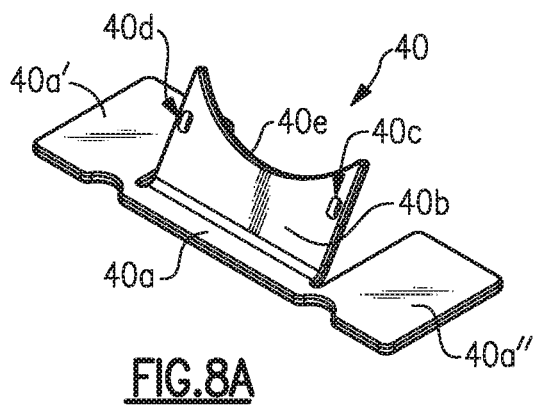
Figure 8B:
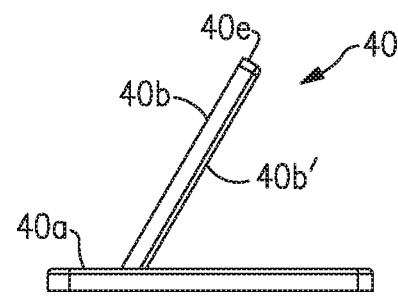
Figure 8C:
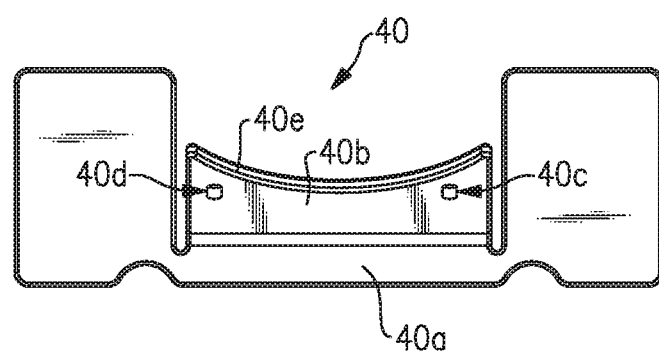
Figure 8D:
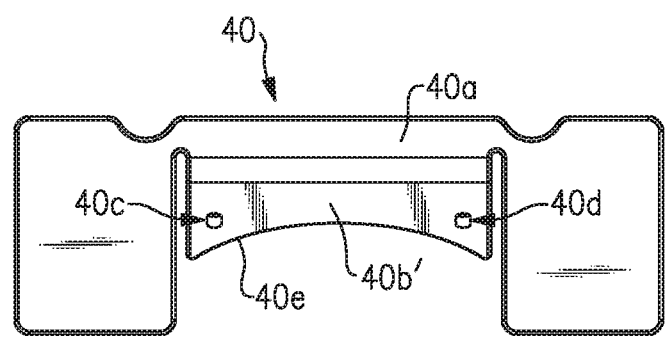
Figure 8E:
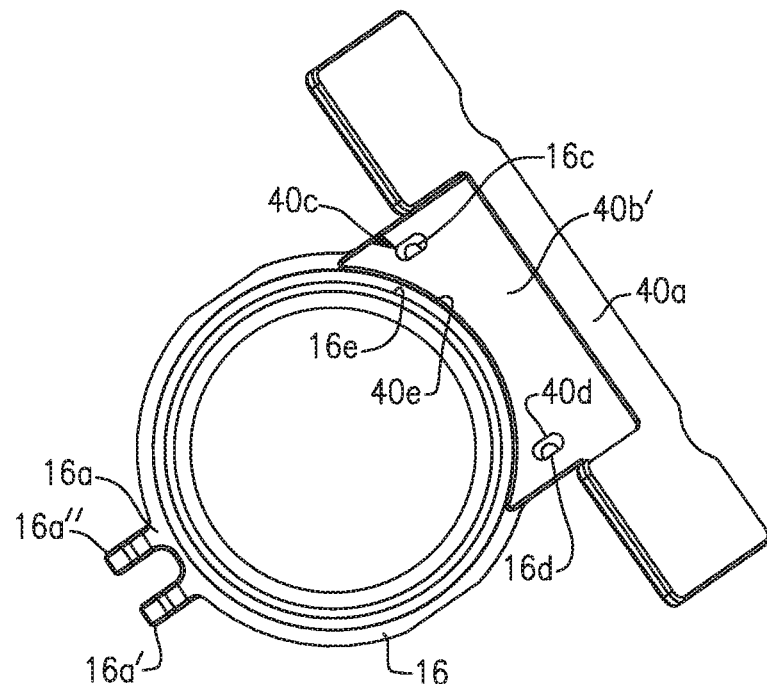
Figure 8F:
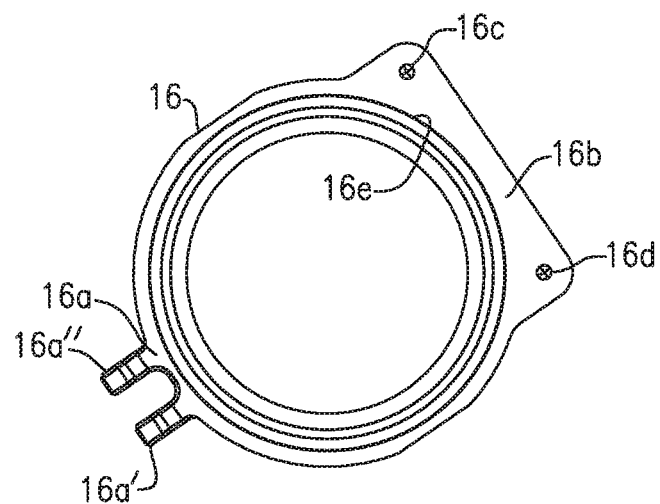
Figure 9E:
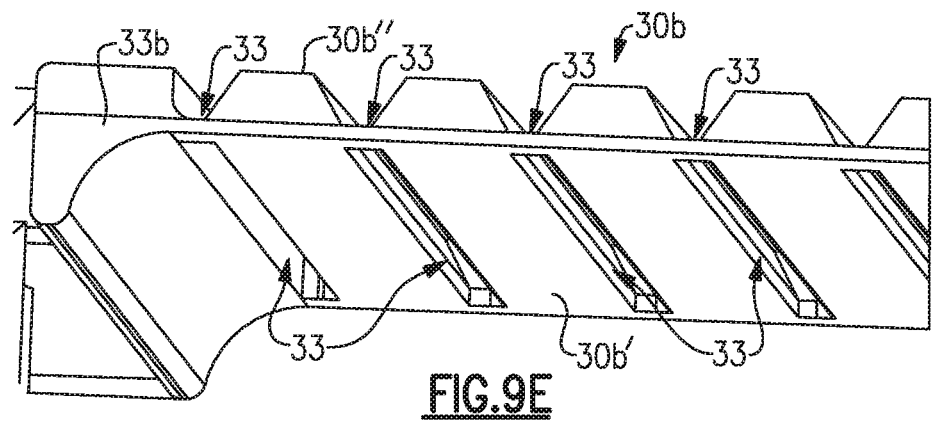
Figure 9F:
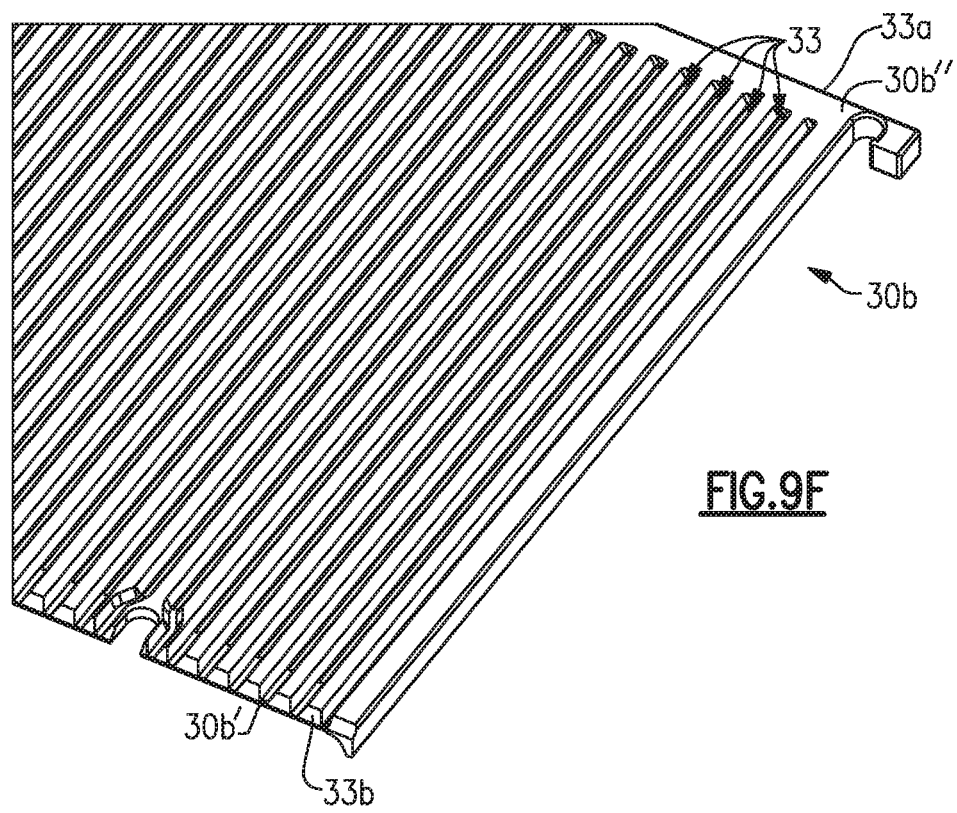

FIGS. 2A-G are front perspective, right side elevation, left side elevation, front elevation, rear elevation, respectively, of the embodiment of FIGS. 1A-G except now with the hopper chute, grinder and chamber cover shown in the lowered position relative to the pressing chamber and the hopper chute lid in the open position relative to the hopper chute;

FIG. 2F is a cross-sectional view thereof as taken generally along the line 2G-2G in FIG. 2A;

FIG. 2G is an enlarged, rear perspective view of the first pressing wall having a platen and juice directing panel shown in spaced relation to each other;

FIG. 2H is an enlarged, front perspective view of FIG. 2G and further including a magnified call-out bubble of the bottom corner section of the juice directing panel;

FIGS. 3A-F are front perspective, right side elevation, cross-sectional as taken generally along the line 3C-3C in FIG. 3A, left side elevation, front elevation and rear elevation views, respectively, of another embodiment of the invention similar to FIGS. 1A-1G and FIGS. 2A-2F except for additional elements being added to the embodiment of FIGS. 3A-F as described in the Detailed Description, and except now with the hopper chute, grinder and chamber cover shown in the lowered position and the hopper chute lid in the covering position relative to the hopper chute;

FIGS. 4A and 4B are perspective and side elevation views of an embodiment of pusher;

FIGS. 5A-5D are front perspective, rear elevation, front elevation and side elevation views of the grinder housing according to an embodiment of the invention;

FIG. 6A is a front perspective view of elements of the grinder and grinder housing shown in spaced relation to each other;

FIG. 6B is a front perspective view of the grinder and grinder housing shown assembled with a fragmented part of the grinder pivot arm;

FIG. 6C is a side elevation view of the grinder elements shown without the grinder housing;

FIG. 6D is a bottom perspective view of FIG. 6B;

FIG. 6E is an enlarged, fragmented, perspective view of a section of the ring and grinder upper plate and lopper;

FIG. 6F is an enlarged, fragmented, perspective view of the grinder ring, grinder plate and grinder housing;

FIG. 6G is a top plan view of the grinder;

FIG. 6H is a perspective view of the lopper;

FIG. 7 is a fragmented, perspective view of grinder in the lowered position relative to the pressing chamber and the pressing chamber cover removed to reveal the path of food stuff exiting the grinder and being delivered into the pressing chamber;

FIGS. 8A-8D are perspective, side elevation, top plan and bottom plan views of the pressing chamber cover, respectively;

FIG. 8E is a bottom plan view of the pressing chamber cover removably attached to the chute base;

FIG. 8F is a bottom plan view of the chute base;

FIGS. 9A-9D are front elevation, left side elevation, top plan and bottom plan views of the second pressing chamber wall wherethrough pressed juice is passed;

FIG. 9E is an enlarged, fragmented, front perspective view of a segment of the second pressing chamber wall seen in FIGS. 9A-9D; and FIG. 9F is an enlarged, fragmented, rear perspective view of the second pressing chamber wall seen in FIGS. 9A-9E.

DETAILED DESCRIPTION OF A PREFERRED EMBODIMENT

The present invention provides in a first aspect a partial and/or whole food hopper, grinder and cold press juicing machine, system and method.

The present invention provides in a second aspect a partial and/or whole food hopper apparatus, system and method for delivering partial and/or whole fruits and/or vegetables and/or nuts to a macerator.

The present invention provides in a third aspect a grinder apparatus, system and method for grinding partial or whole fruits and/or vegetables and/or nuts.

The present invention provides in a fourth aspect a cold press apparatus, system and method for cold pressing juice from a macerated food product.

The present invention provides in a fifth aspect a disposable filter bag apparatus, system and method for holding macerated food product for cold press juicing.

Referring now to the drawing, there is seen in the various figures an exemplary embodiment of the invention in the form of an apparatus designated generally by the reference numeral 10.

While the invention will be described herein with main reference to the exemplary apparatus 10 shown in the figures, it is understood that the invention extends in one aspect not only to apparatus 10 as a single appliance, but also to the individual components thereof whose operation may be considered independently and separately of the other components as described herein. More particularly, the food delivery components, system and methods, the food grinding components, systems and methods and the food pressing components, systems and methods may each be considered as inventive operative components, systems and methods both on an individual level (e.g., (1) food delivery; (2) grinding; and (3) pressing) as well as in combined, functional cooperation with each other in all possible combinations thereof (e.g., (1) food delivery and grinding; (2) food delivery and pressing; and (3) grinding and pressing).

In a first aspect, apparatus 10 includes a food delivery unit having a hopper or chute 12 which may be in the shape of a cylinder having opposite first and second open ends 12a and 12b. As seen best in FIG. 2A-F, a collar 14 may be attached at first end 12a of chute 12 and a base 16 may be attached to the second end 12b of chute 12. Collar 14 may include an extended arcuate portion 14a with opposite end walls 14c and 14d. The extended portion 14a may include an inwardly extending lip or flange 14b which acts to keep food stuff from being pulled out of chute 12 as pusher 20 is retracted as occurs when an operator is manipulating pusher 20 in the manner of a plunger to repeatedly push and work the food toward the grinder 60. The lip 14b also retains food when the operator retracts pusher 20 to open lid 18 and put the next load of food pieces into chute 12. Generally, chute 12 is filled at least a few times per each juice pressing. It is noted the pusher 20 does not need to be completely removed between food delivery batches as it does not need to swing out to the side. Juice and small food pieces on pusher head 20b drips down into chute 12 even when the lid 18 is open which helps maintain a clean workplace around the apparatus 10.

A removable chute lid 18 may be provided having a side wall 18a and upper wall 18b. Side wall 18a may include notched side walls 18c and 18d to cooperatively mate with collar side walls 14c and 14d, respectively. Lid upper wall 18b may include a recessed arcuate edge 18b' which cooperatively mates with collar flange 14b when lid 18 is in the closed position seen in FIGS. A-F and FIGS. 3A-E. A central opening 18e is formed in lid upper wall 18b wherethrough the shaft 20a of a pusher 20 may slidingly extend (see also FIGS. 4A, 4B). The diameter of opening 18e is preferably small enough to prevent an average size human hand therethrough to prevent accidental injury. A flexible diaphragm 18e' may be attached to cover opening 18e with itself including a central opening to allow the pusher shaft 20a therethrough, but otherwise provide a seal to prevent foreign objects from entering chute 12 or food particles from unintentionally exiting chute 12 through opening 18e.

Figure 1A:
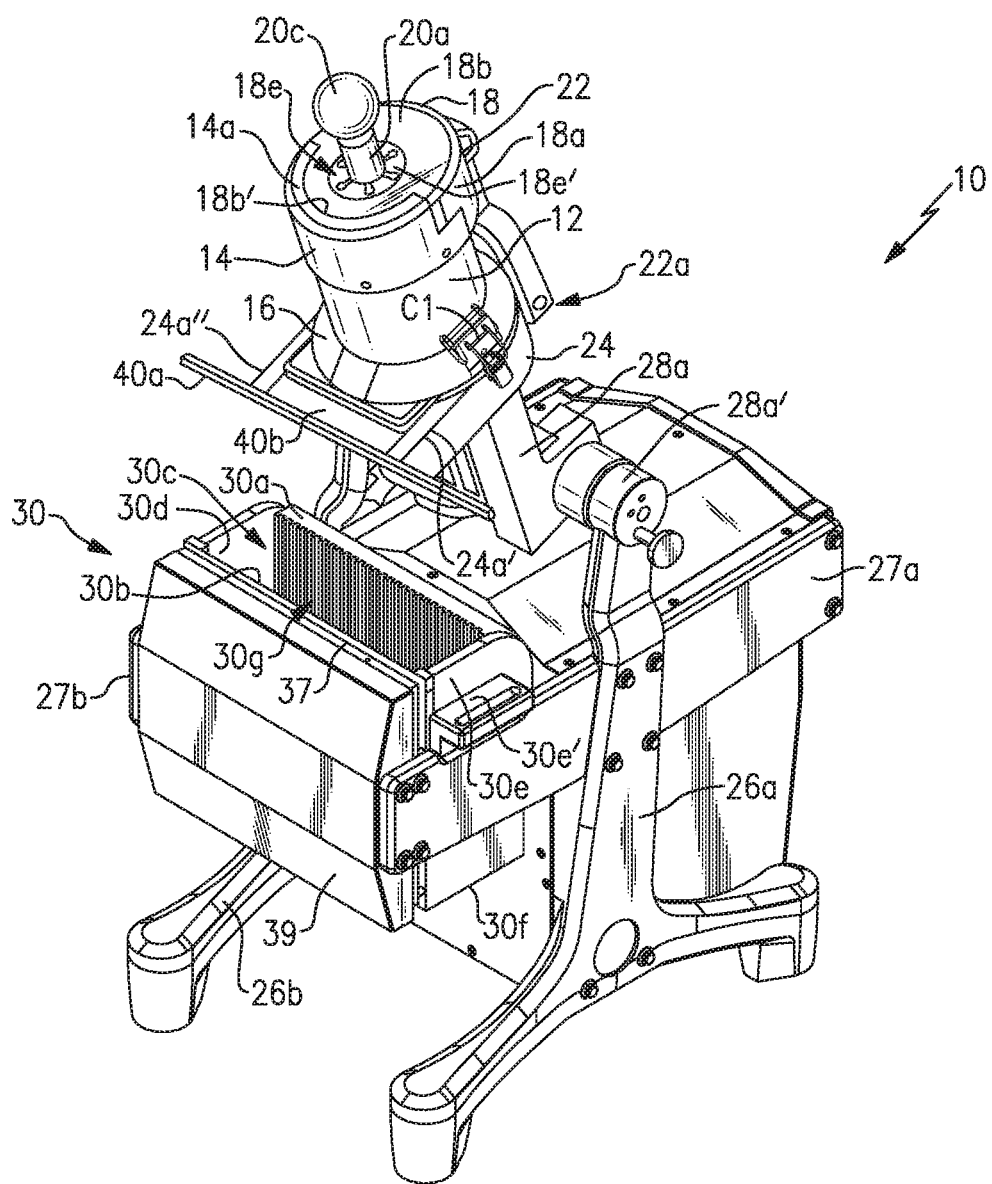
FIG. 1A is a front perspective view of hopper, grinder and cold press juicing machine according to an embodiment of the invention with the hopper chute, grinder and chamber cover shown in the raised position relative to the empty pressing chamber and the hopper chute lid in the closed position.
Figure 1B:
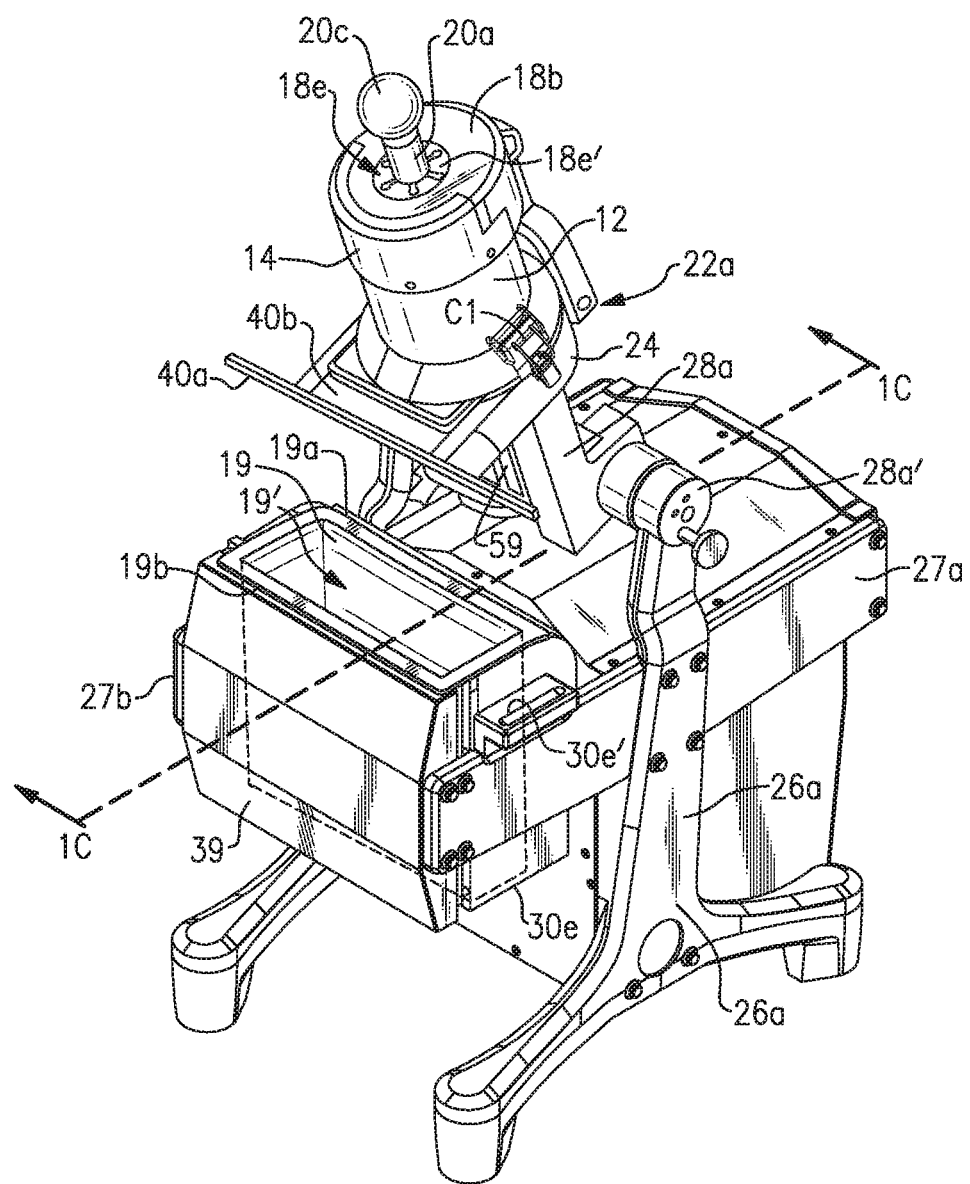
FIG. 1B is the view of FIG. 1A showing a filter positioned in the pressing chamber.
Figure 1C:
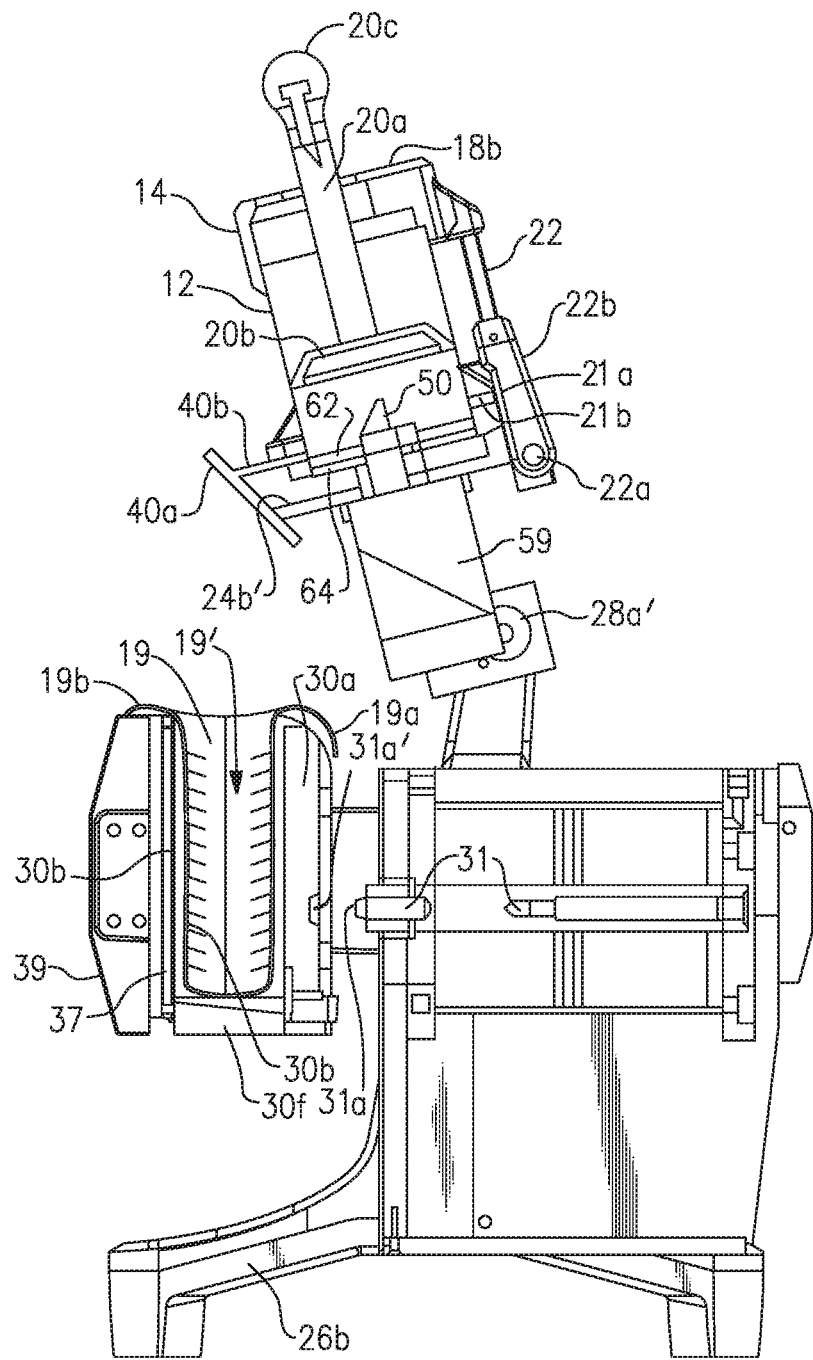
FIG. 1C is a cross-sectional view thereof as taken generally along the line 1C-1C in FIG. 1B.
Figure 1D:
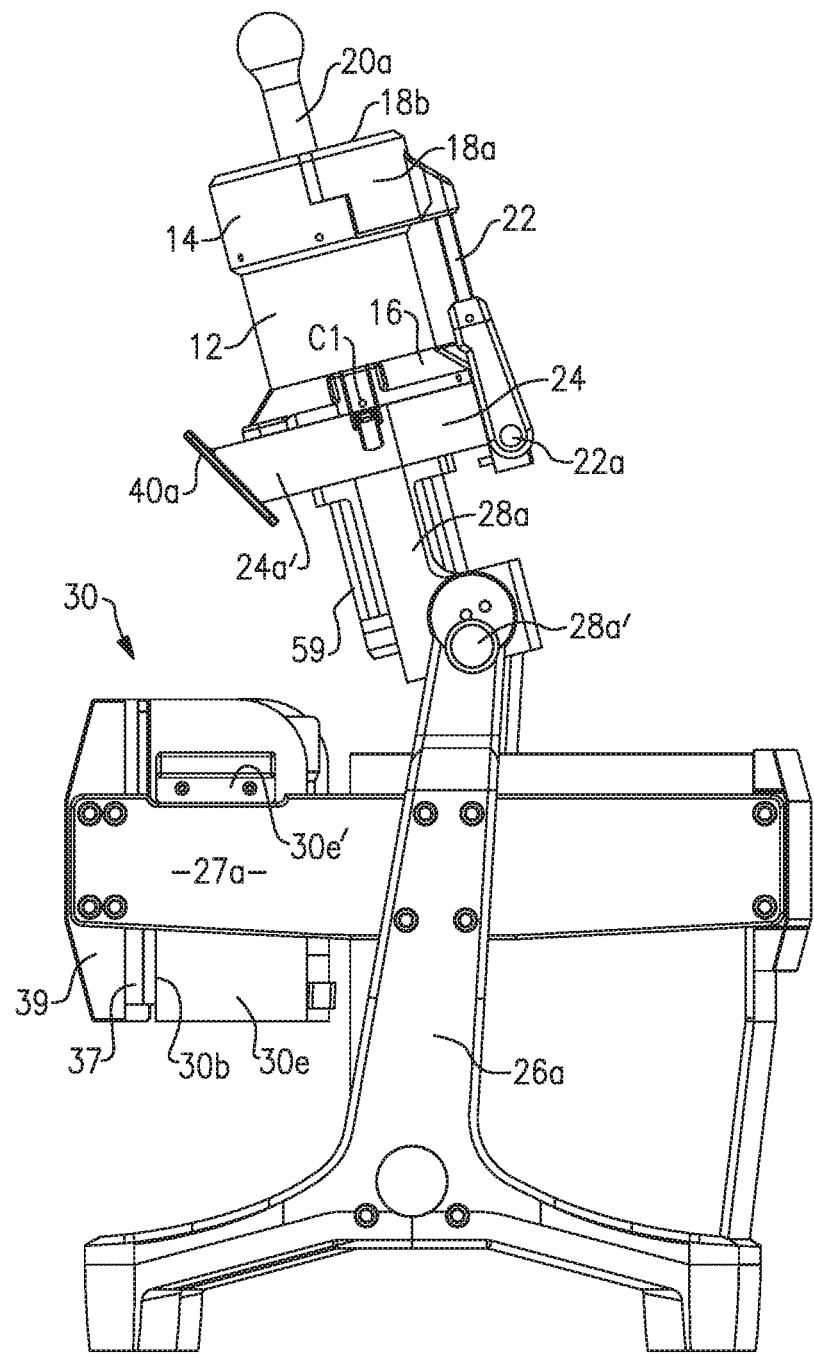
FIGS. 1D-1G are right side elevation, left side elevation, front elevation and rear elevation views thereof, respectively.
Figure 1E:
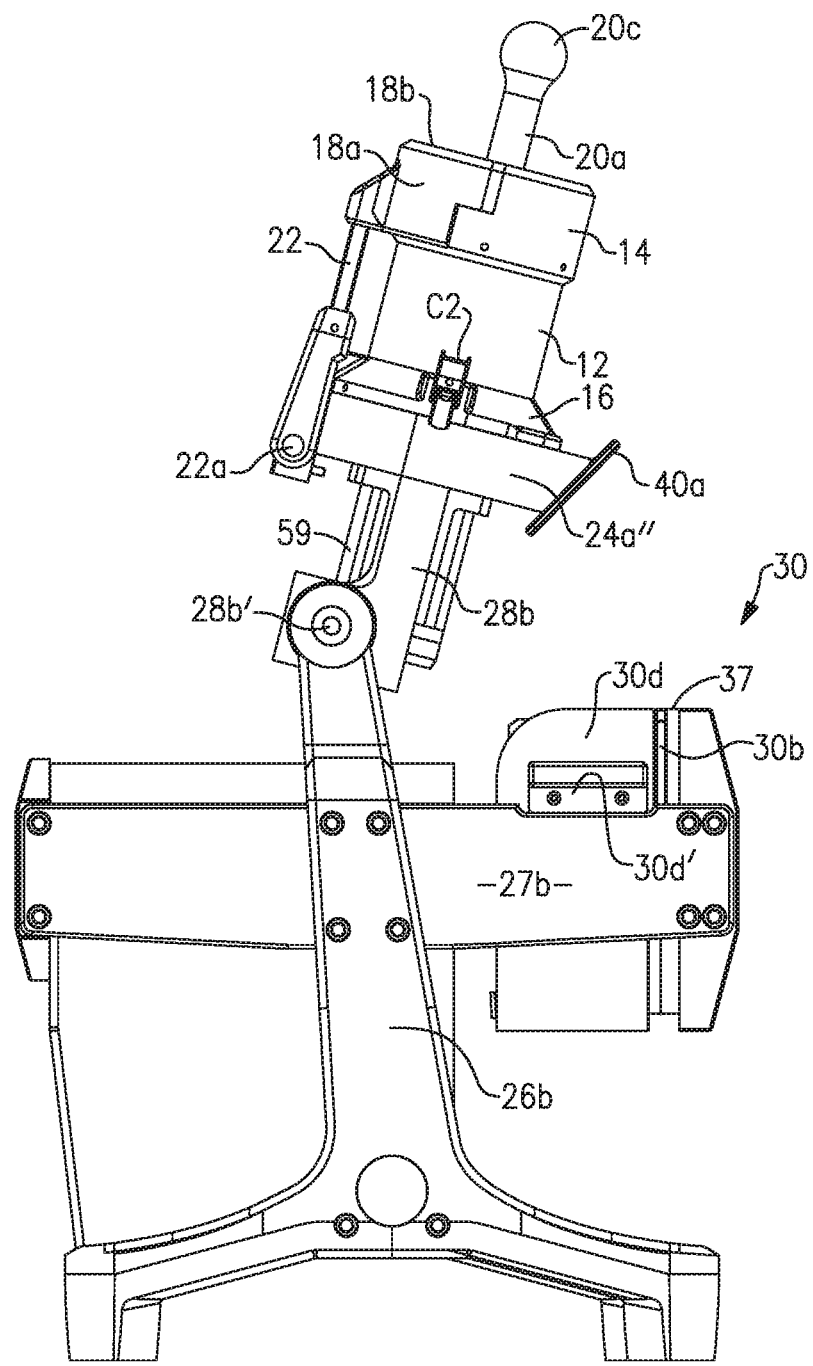
Figure 1F:
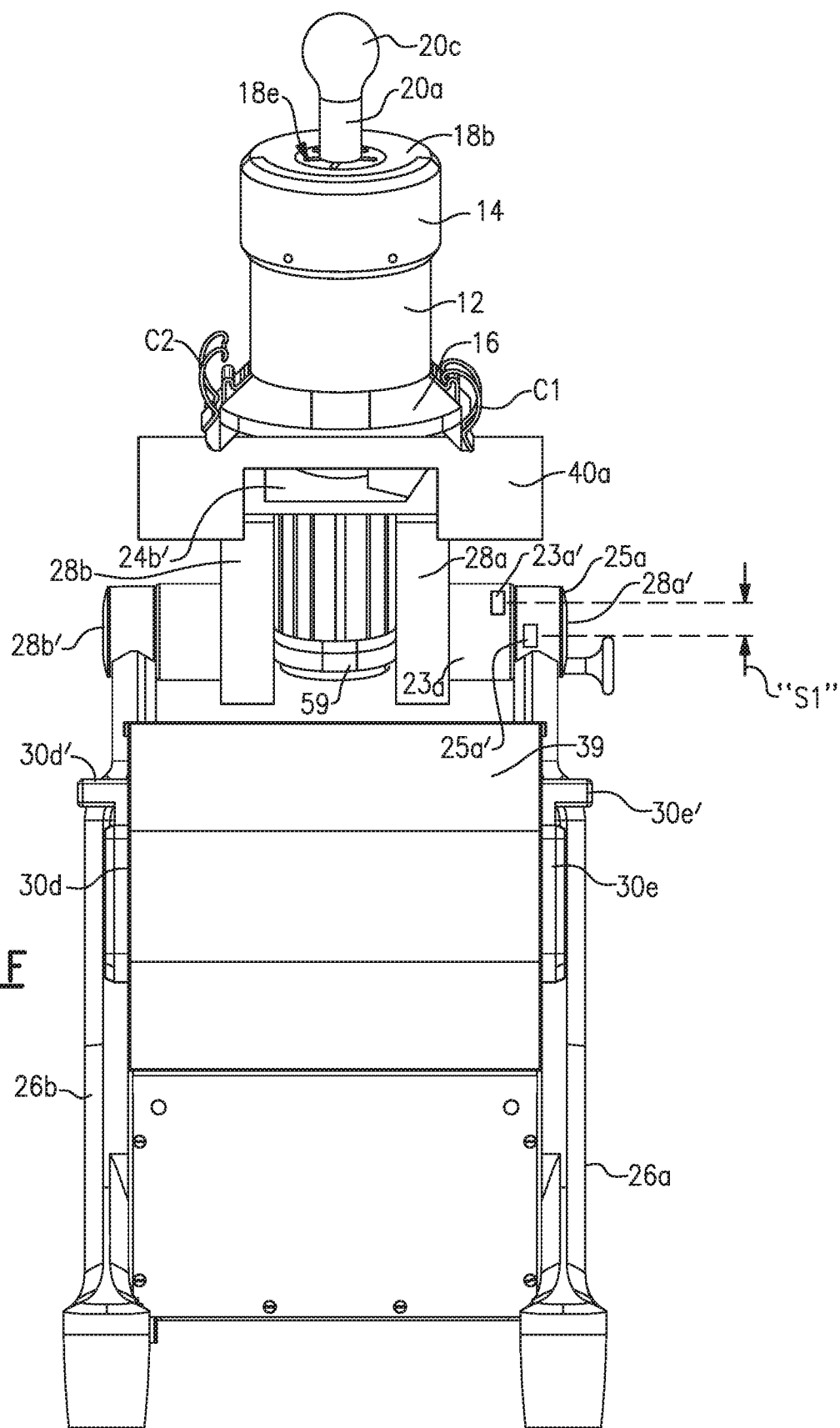
Figure 1G:
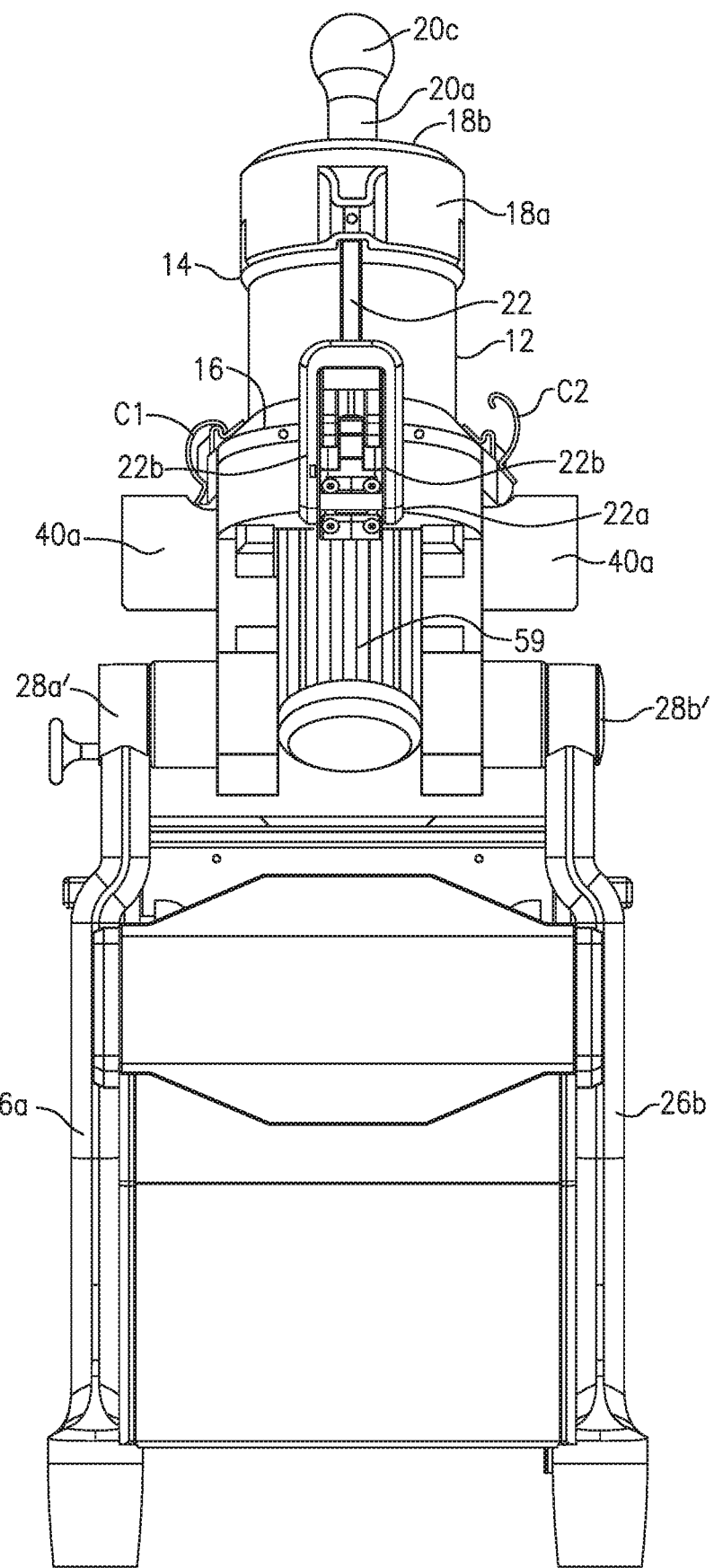
Figures 1H, 1I:
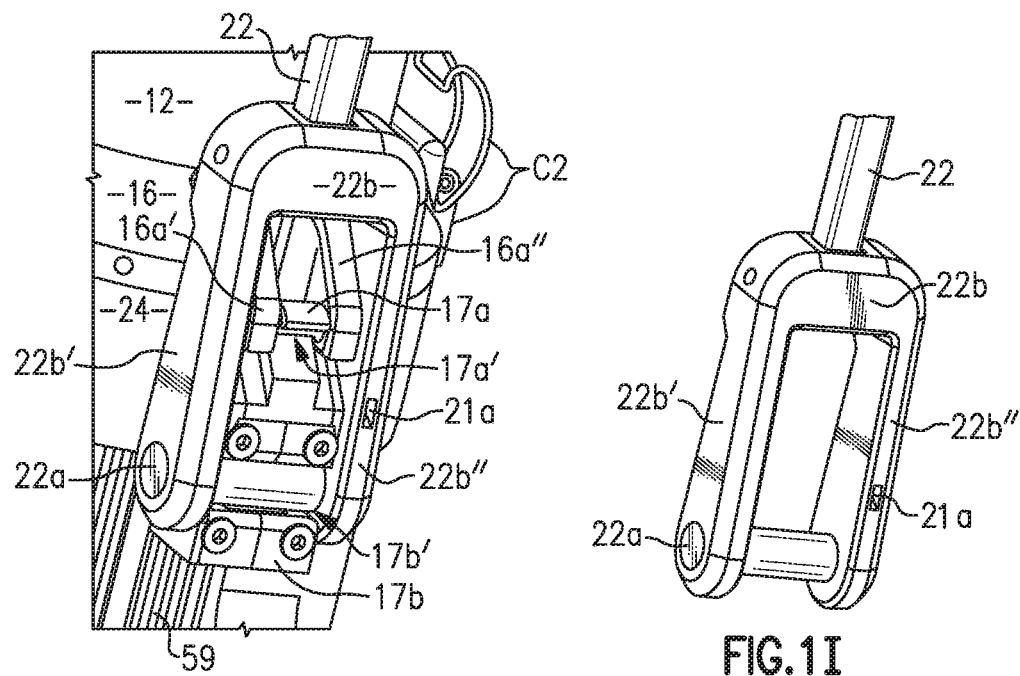
FIG. 1H is an enlarged, fragmented, perspective view of the attachment elements between the lid arm and lid arm bracket and the grinder housing, and the chute base and the grinder housing.
FIG. 1I is an enlarged, fragmented, perspective view of the lid arm and lid arm bracket seen in 1G and 1H.
Figure 1J:
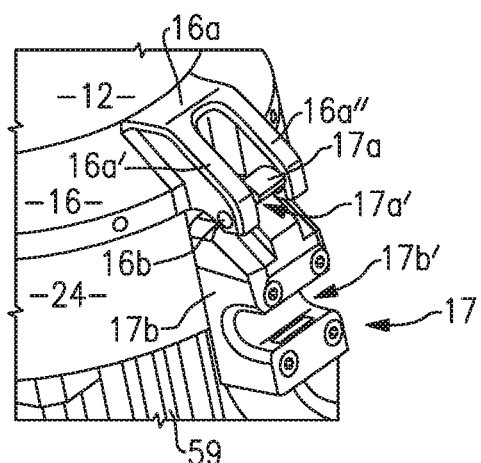
FIG. 1J is an enlarged, fragmented, perspective view of the attachment elements seen in FIG. 1H.

Chute lid 18 may be attached to the first end of an arm 22 which may be pivotally connected at the opposite end thereof to a lid arm bracket 22b having bifurcated forks 22b', 22b" (see also FIGS. 1H and 1J). A pivot pin 22a extends between forks 22b', 22b" and removably mounts within a channel 17b' formed in base 17b of a bracket 17 mounted to grinder housing 24. Lid 18 may be selectively moved between the closed condition seen in FIGS. 1A-F and 3A-E and the open position seen in FIG. 2A-F by pivoting arm 22 and arm bracket 22b about pivot 22a. Lid 18 may be removed from chute 12 by removing arm 22 from the bracket (e.g., for cleaning and storage).

As seen best in FIGS. 2A, 2D and 2F and when lid 18 is in the open position, the interior "I" of chute 12 is accessible allowing a user to deposit partial and/or whole food into chute interior "I". Lid 18 may be set to rest in this open position by removably engaging the circumferential edge 20b' of pusher head 20b (see also FIGS. 4A and 4B) with a notch 14e formed in collar 14 in the segment thereof located opposite extended segment 14a. Pusher 20 further includes a handle which may be in the form of a knob 20c at the end of shaft 20a opposite pusher head 20b. Pusher head 20b may be configured in a dome shape including an internal cavity 20b" which allows pusher head 20b to reach deep into chute 12 as explained further below. The diameter of pusher head 20b is almost the same as the inner diameter of the chute to ensure the inner wall of the chute can be easily scraped with pusher head 20b.

Grinder housing 24 and chute 12 may be removably attached to each other via any suitable means such as clamps "C1" and "C2" which may each have their releasably attachable pair of components fixed to grinder housing side wall 24a and base 16, respectively. A further removable connection point may be provided in the form of a hinge bracket 16*a* attached to base 16 which includes a pivot pin 16*b* which may be removably captured in channel 17*a'* of bracket 17 (see FIG. 1). It will thus be appreciated that chute 12 may be quickly detached from the grinder by unclamping clamps C1 and C2 and removing pin 16*b* from channel 17*a'* (for cleaning, for example), and subsequently reattached to each other by reinserting pin 16*b* in channel 17*a'* and re-clamping clamps C1 and C2 for the next juicing operation.

The grinder housing 24 may be mounted to a suitable frame such as first and second legs 26*a* and 26*b*, respectively. Grinder housing 24 may attach to frame legs 26*a*, 26*b* via frame arms 28*a*. 28*b* which may be pivotally connected at pivot connections 28*a'*, 28*b'* to legs 26*a* and 26*b*, respectively. A spacer element 23*a* and 23*b* may be provided between frame arms 28*a*, 28*b* and respective frame legs 26*a*, 26*b*, the spacer elements rotating together with the pivot movement of grinder housing 24.

Grinder housing 24 and chute 12 may thus be pivoted together as a unit between the raised position seen in FIGS. 1A-G, and the lowered position seen in FIGS. 2A-E and FIGS. 3A-F. When grinder housing 24 is in either the lowered or raised positions, chute lid 18 may be moved relative to chute 12 and collar 14 between the closed, covered position seen in FIGS. 3A-E and the uncovered position seen in FIGS. 2A-F as will be discussed in further detail below.

A pressing chamber 30 may be removably attached to a frame such as frame legs 26*a*, 26*b* via first and second opposite side plates 27*a*, 27*b*, respectively. The opposite side walls 30*d*, 30*e* of chamber 30 may include handles 30*d'*, 30*e'* which may sit upon opposite side plates 27*a*, 27*b*, respectively, and thereby support chamber 30 above the surface upon which frame legs 26*a*, 26*b* are placed. Pressing chamber 30 may include first and second opposite pressing walls 30*a*, 30*b*, respectively, either one or both of which may be movable toward and away from the other. In the embodiment shown in the drawing, first pressing wall 30*a* is movable while second pressing wall 30*b* is stationary.

As seen in FIGS. 2G and 2H, first pressing wall 30*a* may include a platen 30*a'* and a juice directing panel 30*a"* attached to and movable together with platen 30*a'*. Platen 30*a'* may include a recess 31*a'* which may be removably engaged by a rod end 31*a* attached to a piston 31 (see FIG. 2F) or the like (which may be of any desired type including mechanical, pneumatic or hydraulic, for example) operable to move first pressing wall 30*a* toward second pressing wall 30*b* which remains stationary. When pressing wall 30*a* is in the retracted position seen in FIGS. 1A-C, pressing chamber 30 defines a chamber interior 30*c* bounded by first and second pressing walls 30*a*, 30*b*, opposite side walls 30*d*, 30*e*, and bottom wall 30*f* with an open top 30*g* located opposite bottom wall 30*f*.

As seen in the magnified call-out of FIG. 2H juice directing panel 30*a"* may include a plurality of vertically extending spaced openings 29 wherethrough juice pressed in chamber 30 is passed and falls by gravity and/or fluid pressure toward the bottom of chamber 30 as indicated by the arrows "J".

When grinder housing frame 24 is in the raised position seen in FIGS. 1A-E, the chamber interior 30*c* is accessible and a filter bag 19 with an open top 19' may be removably positioned therein in as seen in FIGS. 1B and 1C in preparation for a juicing cycle. In one embodiment, filter bag 19 is made of a disposable paper filter material which may be similar to that used in the manufacture of tea bags or filters for drip coffee makers, for example. The filter may be sized so that when the bottom of the filter rests upon chamber bottom wall 30*f*, the upper edges 19*a* and 19*b* of filter 19 extend out of chamber open top 30*g* so that they may be laid over the top edges of the first and second pressing walls 30*a* and 30*b*, respectively. If desired, removable filter securing elements may be provided on pressing chamber 30 such as pegs or the like (not shown) attached to the pressing chamber which may be engaged by holes formed in the top edges 19*a*. 19*b* of filter 19.

It is noted that filter 19 may be made relatively thin and light weight since it is supported on all sides except the open top thereof by chamber 30. Specifically, chamber bottom wall 30*f* supports the bottom of the filter 19 while the front, back and opposite sides of the filter 19 are supported by pressing chamber walls 30*a*, 30*b*, 30*d* and 30*e*, respectively. Unlike prior art filters and pressing chambers which close the filter open tops to prevent escape of macerated food stuff inside the filter as it is being pressed, the open top 19' of filter 19 does not need to be closed prior to the pressing operation and no macerated food stuff will escape. Furthermore, due to the pressing chamber providing support for all sides and bottom of the filter, the filter, despite it being made from a relatively delicate, lightweight material, will not rupture under pressure during a pressing operation. This allows the use of a lightweight filter material with the inventive cold press juicing apparatus which provides the benefit of a lower filter cost which means the filters may be disposable, single use filters. The ability to use single use filters not only lowers juicing operating costs, but also avoids the sanitation issues inherent with filters that are more durable and expensive and hence used multiple times prior to being replaced or cleaned. This makes the present invention very appealing not only on an ease of use basis, but also on an economical basis to cold press juice businesses which provide pre-bottled juice and/or made to order cold pressed juice for their customers.

One or both of the first and second pressing walls 30*a*. 30*b* may include pressed juice directing elements which can be any desired feature or features which operate to direct pressed juice toward a chamber juice exit. In the embodiment shown in the drawing, the juice directing elements are in the form of vertically extending, spaced openings 33 formed in second pressing wall 30*b* as seen best in FIGS. 9A-F. Second pressing wall 30*b* includes a first wall surface 30*b'* which faces first pressing wall 30*a*, and an opposite wall surface 30*b"* which faces a plate 37 which is mounted closely adjacent wall surface 30*b"*. Juice which is pressed through filter bag 19 exits chamber 30 through openings 33 and falls by gravity and/or fluid pressure between plate 37 and wall 30*b"* where the juice may be collected. In the embodiment seen in FIGS. 3A-F, a liquid collection pan 35 is mounted beneath chamber 30 to collect juice falling from between plate 37 and pressing wall surface 30*b"*. Pan 35 may include a tapered bottom having an outlet 35' wherethrough juice may flow as indicated by arrow "J". A pitcher or other vessel (not shown) may be positioned at opening 35' to collect the pressed juice which is ready for consumption or cold storage. It is noted the area between pressing wall 30*b* and plate 37 is at a lower pressure than inside filter 19 as it is being pressed. This pressure differential causes the juice to be actively "pulled" out of filter 19 through openings 33. It also noted the openings 33 are selected to be of a width that supports filter material 19 under pressure. If the openings were too wide, the filter material would be unsupported over a large area and thus prone to rupture under pressure.

Referring now to the grinder, there is in FIGS. 6A-H a grinder 60 which may include a cutting ring 62 and a circular plate 64. Cutting ring 62 includes a plurality of spaced teeth 62a extending radially inwardly about the inner circumference of the ring 62. Each tooth 62a includes an edge 62a' which extends at an acute angle "A" (see FIG. 6G) although other geometries are possible such as raised ridges, for example. Plate 64 includes a circular top segment 64a having a diameter D1 (see FIG. 6A) and a bottom segment 64b which may have a smooth circumferential wall or include at least one but preferably a plurality of spaced teeth 64b' about the circumference thereof, the free ends of which define a bottom segment diameter D2 which is greater than diameter D1. The inside diameter D3 of ring 62 measured from the free ends of diametrically opposite teeth 62a is slightly larger than diameter D1 of plate top segment 64a such that plate top segment 64a fits within ring 62. The width W2 of plate top segment 64a is smaller than the width W1 of ring 62 such that teeth 62a extend beyond plate top segment 64a. When ring 62 and plate 64 are mounted together in housing 24, a small gap "G" (e.g., about 50 thousands of an inch) is defined between the upper surface of the plate 64 and the lower surface of the ring 62. Food stuff may be forced radially outwardly through gap "G" or exit in between adjacent teeth 64b'.

It is noted that the inner diameter D12 of chute 12 (see FIG. 2B) is preferably almost equal to the diameter D2 of ring 62 (see FIG. 6G). This prevents creation of pockets or undercuts at the juncture of the chute and grinder which would otherwise form if the chute diameter were much larger or smaller than the ring 62. A pocket or shoulder is undesirable in that it prevents the food pieces from tumbling and recirculating within the grinder which is beneficial and especially important for leafy and/or high water content food types like kale which have a tendency to pack under shoulders and create a compressed wad. If a wad were to form, the wad continues to spin around with the lopper 70 and the centrifugal force continues to compress the wad which reduces room at the grinder for new kale. The wad thus acts as an obstacle and the machine must be shut down in order to remove the wad prior to continuing with the juicing operation. Thus, by having no shoulders or restriction in diameter at the chute/grinder juncture, the food pieces are free to circulate throughout the chute as well as at the grinder. Again, this is especially beneficial with flexible and light food types like kale which benefit from engaging the lopper and ring 62 at multiple different orientations in order to chop. As described below, the pusher 20 is hand held and allows the operator to repeatedly back out and re-feed the fruits and vegetables in the chute 12. It is beneficial for the food pieces to repeatedly tumble at the grinder as the food pieces are being ground.

As seen in FIGS. 5A-5D, grinder housing 24 includes an arcuate side wall 24a and an annular bottom wall 24b having a central opening 24c encircled by a raised flange 24c'. Grinder housing 24 is configured and sized to enable ring 62 to be seated upon housing side wall inner flange 24a'''. The external circumferential wall 62' of ring 62 may be made non-round and/or asymmetrical to prevent rotation of ring 62 and ensure correct assembly orientation thereof within housing 24 although other means for rotationally fixing ring 62 may be used as desired (e.g., set pins). A motor mount 52 attaches to the output shaft of the grinder motor 59 and extends through opening 24c in housing 24. (It is noted that in the embodiment of FIGS. 1A-1G and FIGS. 2A-2F, grinder motor 59 is visible. In the embodiment of FIGS. 3A-3F, a motor housing 59' is positioned about motor 59). An upper plate mount 52a extends from motor mount 52 and is sized to enable plate 64 to be mounted thereon via central opening 64c in plate 64 (see FIG. 6A). Rotation of motor mount 52 via the grinder motor 59 rotates plate mount 52 causing rotation of plate 64.

A cutting element in the form of a lopper 70 is fixed to plate upper surface 64a along a radial line thereof. Although lopper 70 is shown as linear, other configurations are possible such as curved although attention must be given to ensure the configuration chosen does not introduce catching points which might trap and prevent food pieces from exiting the grinder 60. When plate 64 is assembled with ring 62 in grinder housing 24, the width W3 of teeth 62a is substantially the same as the width W4 of lopper 70 (see FIGS. 6F and 6H). Lopper 70 includes one or more cutting edges such as linear cutting edge 70' which faces in the direction of rotation of plate 64 (counter-clockwise in the embodiment shown in the Figures).

An agitator 50 may be mounted via a cap 50' fixed to the upper plate mount 52a at the center of plate 64 and rotates therewith. Agitator 50 may be triangular in shape as shown, having an apex 50", although other shapes are of course possible. Agitator 50 is positioned centrally so that food delivered into chute 12 will deflect radially outwardly upon encountering apex 50" and is thereby less likely to become temporarily or permanently stuck at the center of the grinder rather than being delivered into the path of the lopper 70 for cutting as it should be.

It is noted that pusher head 20b internal cavity 20b" is preferably shaped and sized so as to fit over agitator 50 which allows pusher head edge 20b' to reach ring 62 and thereby ensure the operator is able to use pusher 20 to push food stuff against agitator 50, ring 62 and plate 64. The operator may manipulate pusher 20 not only linearly back and forth along a longitudinal axis within chute 12, but also tilt pusher shaft 20a at any off-axis angle which allows the operator a large degree of freedom of pusher movement. This is beneficial in that there is a tactile feedback as the pusher is manipulated against food in chute 12 and this freedom of pusher movement enhanced the operator's ability to feel and push the food toward the grinder in the most efficient manner.

Besides being able to handle partial or cut food pieces, large pieces of food including, but not necessarily limited to, previously uncut (whole) food (e.g., apples, kale leaves and stalks, carrots, ginger root, etc.) may be delivered into chute 12 and cut into small pieces by grinder 60. Since the inventive grinder system described herein is capable of handling large partial and/or and whole food, there is no need for a preliminary food size reduction process and preparation time is therefore significantly reduced which provides significant cost savings for a retail cold press juicing establishment.

More particularly, partial and/or whole pieces of food deposited into chute 12 fall upon plate surface 64a and are directed radially outwardly due to the centrifugal force of rotating plate 62 as well as mechanical deflection of any food that encounters apex 50" as it falls toward plate 62. The lopper cutting edge 70' cuts through large food pieces as it rotates along with plate 62. As food is cut, the pieces are intermittently, and repeatedly, if not continually pushed against teeth 62a where the teeth edges 62a' engage and hold the food piece in position as the lopper edge 70' passes by that tooth and proceeds to cut the food into yet an ever smaller piece. This tooth engagement followed by lopper edge 70' cutting action continues in a rotationally serial fashion with the food pieces cutting into smaller and smaller pieces until they are of a size that can fit and fall between adjacent teeth 62a and thereafter either pass between adjacent plate teeth 64b' or exit from at the perimeter of gap "G" defined between ring 62 and plate 64 (FIG. 6C). When the space between two adjacent teeth 62a of ring 62 align with the space between two adjacent teeth on plate 64b', a hole "H" is defined (see FIG. 6D). In this regard, it is noted the spacing between plate teeth 64b' and ring teeth 62a may be equal but are preferably not equal so that alignment holes "H" form at ever-changing locations about the circumference of ring 62 as the plate 64 rotates with respect to stationary ring 62. As such, there will always be at least one hole "H" formed at any given time so that food may be continuously driven through and exit grinder 60.

Referring still to FIG. 6D, a thread "T" of a fibrous food type such as ginger root is seen exiting a hole "H" without encountering any edge or surface upon which thread "T" could be become entangled. This is extremely beneficial in that prior art grinders either are unable or are notoriously difficult to use with fibrous roots due to entanglement of the fibers within the grinder mechanism. This can cause overheating and failure of the grinder until the obstacle is removed. The present grinder avoids this problem with the food passage holes "H" which allow the threads "T" to be pulled from holes "H" by teeth 64b' and thereafter "thrown" radially outwardly due to the centrifugal force of spinning teeth 64b'.

The food stuff that has been reduced in size by passing through ring 62 and plate 64 deposits on grinder housing bottom wall 24b. A wiper 61 may be mounted to the lower surface of plate 64 in a radially extending fashion. Wiper 61 is shaped and sized to rotate together with plate 64 and thereby continuously push food stuff deposited on wall 24b toward exit ramp 24b'.

To begin a juice pressing operation, the grinder and chute are moved to the raised position seen in FIG. 1A and the pressing wall 30a is moved to the retracted position as shown. A filter 19 is positioned in chamber 30 as shown in FIGS. 1B and 1C and grinder housing 24 and chute 12 are moved to the lowered position seen in FIG. 3A. An operator uncovers chute lid 18 and rests the lid 18 in this position by engaging pusher head edge 20b' in the collar slot 14e as seen in FIGS. 2A and 2B. The operator may then proceed to deposit partial or whole food pieces into chute interior "I". Once chute 12 is filled with the desired amount of food, the operator lifts pusher head edge 20b' from slot 14e and places the lid 18 onto collar 14 as seen in FIG. 3A.

It is noted that when the operator moves the grinder and chute to the lowered position about pivot point 28a', the chamber cover plate 40a encounters and comes to rest over chamber open top 30g and thereby automatically locates the grinder and chute relative to the pressing chamber in the desired relational position for a juicing operation and overrotation of grinder and chute is thereby prevented. The chamber cover 40 may include an upper plate 40b which is angled with respect to cover plate 40a and configured to extend between grinder housing side walls 24a' and 24a" and rest upon recessed surface 24d' and 24d" thereof (see also FIG. 5C). When fully coupled to grinder housing 24, cover 40 upper plate 40b spans between grinder housing legs 24a' and 24a" whereby the path "P" from the chute exit ramp 24b' into chamber opening 30g is completely enclosed. Additional means for releasably securing chamber cover 40 to base 16 may be provided by pins 16c and 16d located on base extension 16b which releasably register within alignable holes 40c, 40d as seen in FIGS. 8E and 8F. Alternately, as seen in FIG. 3A, a pair of tabs T1 and T2 may be provided on housing walls 24a" and 24a', respectively, which may removably engage with indents 11 and 12 formed on cover top wall 40b.

Safety features may be provided to ensure safe operation of the cold press juicing apparatus 10. A first safety feature may be provided to automatically turn grinder motor 59 off and stop grinder rotation whenever chute lid 18 is open. As seen in FIGS. 1C and 2F, a sensor device having paired sensor elements 21a, 21b (e.g., of the magnetic type) is electrically connected to motor 59 and is operable to allow motor 59 to operate when elements 21a and 21b are placed in close proximity to each other as seen in FIG. 1C, and stop motor 59 when elements 21a and 21b are moved away from each other as seen in FIG. 2F. Thus, whenever an operator opens lid 18 from chute 12, as when preparing to load food into chute 12, elements 21a and 21b are spaced from each other and motor 59 will not operate. This safety feature prevents the grinder from operating whenever chute 12 is open and thus eliminates any risk of operator hand injury should the operator feel the need to reach their hand into chute 12.

A second safety feature may be provided to automatically turn off grinder motor 59 when grinder housing 24 is moved from the lowered position seen in FIGS. 2A-F and FIGS. 3A-3F to the raised position seen in FIGS. 1A-G. Comparing FIGS. 1F (grinder raised) and 2D (grinder lowered), sensor elements 23a', 25a' (e.g., of the magnetic type) may be mounted in spacer 23 and frame end cap 25a, respectively. Since frame end cap 25a is stationary and spacer element 23 rotates together with grinder 60 as it is alternately raised and lowered relative to pressing chamber 30, sensor element 23a' is positioned so as to align along axis x-x with sensor element 25a' when grinder 60 is lowered and in position for a juicing operation. When sensor elements 23a' and 25a' are aligned in this manner, grinder motor 59 is not caused to turn off. When grinder is moved to the raised position, spacer 23 also rotates relative to stationary cap 25a and sensor 23a' is no longer positioned along axis x-x. The spacing "S" between the respective rotational positions of sensor elements 23a' and 25a' is sufficient to turn off grinder motor 59. Thus, whenever the grinder is raised relative to the pressing chamber, motor 59 is off and grinder rotation stops.

Motor 59 will also be turned off and grinder rotation will stop in this manner should the operator forget to attach the chamber cover 40 to base 16. This is because absent chamber cover 40, the operator could over-rotate grinder 60 whereby housing 24 would begin to enter chamber 30. Over-rotation could also occur if pressing chamber 30 was not in place. Should such over-rotation occur, sensor elements 23a' and 25a' will be out of alignment and will turn off the grinder motor 59. This is an additional benefit for operator safety because without the chamber cover 40, an operator could potentially insert their fingers/hands up inside the grinder housing 24, and also down into the pressing chamber 30.

While the invention has been shown and described with reference to certain preferred embodiments thereof, it will be understood by those skilled in the art that various changes in form and details may be made therein without departing from the spirit and scope of the invention as described.

What is claimed is:

1. An apparatus for grinding food, comprising:
 a grinder housing having a bottom wall with a central opening and side wall having an opening defining a food exit ramp;
 a grinder removably attachable to said grinder housing and spaced above said grinder housing bottom wall, whereby the grinder is configured such that food passing through said grinder is ejected toward the side wall;
a chute having an interior extending between open and opposite first and second ends, said second end located adjacent said grinder;
a lid selectively movable between open and closed positions with respect to said first end of said chute, wherein said chute interior is accessible with said lid is in said open position;
a motor configured to rotate said grinder;
a sensor device configured to stop said motor in response to said lid being moved to the open position; and
a pressing chamber having:
first and second pressing walls, at least one of said pressing walls selectively movable toward and away from the other said pressing wall,
a pressing plate mounted adjacent said second pressing wall,
said first pressing wall being removably attachable to a platen,
a chamber bottom wall,
opposite first and second chamber side walls extending between said first and second pressing walls, and
an open top leading to a chamber interior.

2. The apparatus of claim 1, wherein said grinder housing is selectively movable between a lowered position wherein said exit ramp of said grinder housing is located adjacent said open top of said chamber and a raised position wherein said grinder housing is spaced apart from said open top of said chamber.

3. The apparatus of claim 2, further comprising a chamber cover that is configured to be removably attachable to said grinder housing, said chamber cover comprising a chamber cover plate that is configured to be removably located over said open top of said chamber when said grinder housing is moved to the lowered position.

4. The apparatus of claim 1, wherein said sensor device includes a pair of sensor elements configured to be adjacent to each other when said lid is in the closed position and spaced from each other when said lid is in said open position such that said motor stops.

5. The apparatus of claim 1, wherein said second pressing wall includes a first wall surface and opposite second wall surface with a plurality of juice directing elements formed therein.

6. The apparatus of claim 5, wherein said juice directing elements comprise spaced openings extending through said first and second wall surfaces.

7. The apparatus of claim 1, wherein the chamber interior is configured to removably receive a filter therein.

8. The apparatus of claim 1, wherein the grinder comprises:
a cutting ring and plate, said cutting ring removably attachable in rotationally fixed relation to said grinder housing; and
an arm having a first end attached to said lid and a second end pivotally connected to said grinder housing, said arm selectively movable together with said lid between said open and closed positions.

9. The apparatus of claim 8, wherein said sensor device includes a pair of sensor elements configured to be adjacent to each other when said lid is in the closed position and spaced from each other when said lid is in said open position such that said motor stops.

10. The apparatus of claim 9, wherein one of said sensor elements is mounted to said arm and is movable therewith.

11. The apparatus of claim 8, further comprising a pusher having a shaft and a head, wherein said lid includes a side wall and an upper wall, said upper wall comprising a central opening, and wherein the shaft of the pusher is configured for selectively extending through said central opening of said upper wall of the lid with said pusher head disposed within said chute interior.

12. An apparatus for grinding food, comprising:
a grinder housing having a bottom wall with a central opening and side wall having an opening defining a food exit ramp;
a grinder removably attachable to said grinder housing and spaced above said grinder housing bottom wall, whereby the grinder is configured such that food passing through said grinder is ejected toward the side wall, the grinder having:
a cutting ring and plate, said cutting ring removably attachable in rotationally fixed relation to said grinder housing;
a chute having an interior extending between first and second ends, said second end located adjacent said grinder;
a lid selectively movable between open and closed positions with respect to said chute first end, whereby when said lid is in said open position, said chute interior is accessible via the chute first end;
an arm having a first end attached to said lid and a second end pivotally connected to said grinder housing, said arm selectively movable together with said lid between said open and closed positions;
a motor operable to rotate said plate; and
a sensor device operable to stop said motor in response to said lid being moved from the closed position toward the open position; and
a pressing chamber having:
first and second pressing walls, at least one of said pressing walls selectively movable toward and away from the other said pressing wall,
a pressing plate mounted adjacent said second pressing wall,
said first pressing wall being removably attachable to a platen,
a chamber bottom wall,
opposite first and second chamber side walls extending between said first and second pressing walls, and
an open top leading to a chamber interior.

13. The apparatus of claim 12, wherein said lid includes a side wall and an upper wall, said upper wall comprising a central opening.

14. The apparatus of claim 13, further comprising a pusher having a shaft and a head, said shaft configured for selectively extending through said central opening of said upper wall of the lid with said pusher head disposed within said chute interior.

15. The apparatus of claim 14, wherein said pusher head comprises a circumferential edge configured to be adjacent the chute interior wall and facilitate a sliding fit within said chute interior when said pusher shaft is positioned along a longitudinal axis of said chute, said pusher shaft configured to be selectively movable to one or more off-axis positions within said chute interior such that portions of the circumferential edge of said pusher head are directed toward and adjacent portions of said chute interior wall.

16. The apparatus of claim 14, wherein said pusher includes a handle at an end thereof opposite said pusher head, said handle configured to facilitate manual manipulation of said pusher shaft and pusher head within said chute interior.

17. The apparatus of claim 14, wherein said pusher head is dome shaped and comprises an internal cavity.

18. The apparatus of claim 17, further comprising an agitator extending from a top segment of said plate, said internal cavity of said pusher head configured to provide a space wherein said agitator is disposed when a circumferential edge of said pusher head is positioned adjacent said top segment of said plate.

19. The apparatus of claim 12, wherein said sensor device includes a pair of sensor elements configured to be adjacent to each other when said lid is in the closed position and spaced from each other when said lid is in said open position such that said motor stops.

20. The apparatus of claim 19, wherein one of said sensor elements is mounted to said arm and is movable therewith.

* * * * *